(12) United States Patent
Kubota et al.

(10) Patent No.: US 10,230,078 B2
(45) Date of Patent: Mar. 12, 2019

(54) ELECTRIC POWER EQUIPMENT

(71) Applicant: HONDA MOTOR CO., LTD., Tokyo (JP)

(72) Inventors: Taichi Kubota, Wako (JP); Kunihiko Ishizuka, Wako (JP); Eri Katagiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/824,054

(22) Filed: Nov. 28, 2017

(65) Prior Publication Data
US 2018/0151854 A1 May 31, 2018

(30) Foreign Application Priority Data
Nov. 30, 2016 (JP) ................................ 2016-233540

(51) Int. Cl.
| | | |
|---|---|---|
| *H01M 2/10* | (2006.01) | |
| *A01D 34/78* | (2006.01) | |
| *A01D 34/81* | (2006.01) | |
| *A01D 101/00* | (2006.01) | |

(52) U.S. Cl.
CPC .......... *H01M 2/1016* (2013.01); *A01D 34/78* (2013.01); *A01D 34/81* (2013.01); *H01M 2/1022* (2013.01); *A01D 2101/00* (2013.01); *H01M 2220/20* (2013.01)

(58) Field of Classification Search
CPC .. H01M 2/1016; H01M 2/1066; A01D 69/02; A01D 69/025; A01D 34/68; A01D 34/78; A01D 34/81
See application file for complete search history.

(56) References Cited

U.S. PATENT DOCUMENTS

| | | | | |
|---|---|---|---|---|
| 5,606,851 A | * | 3/1997 | Bruener | ............. A01D 34/6806 56/10.8 |
| 6,056,077 A | | 5/2000 | Kobayashi | |
| 6,186,256 B1 | * | 2/2001 | Dignitti | .................. B60R 16/04 180/68.5 |
| 6,658,829 B2 | * | 12/2003 | Kobayashi | ......... A01D 34/6806 56/10.5 |

(Continued)

FOREIGN PATENT DOCUMENTS

| | | |
|---|---|---|
| EP | 2423152 A1 | 2/2012 |
| EP | 2534937 A1 | 12/2012 |
| JP | 2013000024 A | 1/2013 |

OTHER PUBLICATIONS

Extended European Search Report, European Patent Application No. 17203840.8 dated Feb. 7, 2018, 7 pages.

(Continued)

*Primary Examiner* — Hau V Phan
(74) *Attorney, Agent, or Firm* — Armstrong Teasdale LLP

(57) ABSTRACT

A battery (20) of power equipment (1) is received in a battery receiving recess (40) of the power equipment. A lower front end of the battery is provided with an engagement portion (140) configured to be engaged by a rib (50) provided in a lower part of the front end of the battery receiving recess. A first sheet spring member (80) is provided in a rear part of a bottom surface of the battery receiving recess to urge the battery upward. A latch member (66) provided in a rear end part of the battery receiving recess engages a rear end of the battery against the spring force of the first sheet spring member.

10 Claims, 20 Drawing Sheets

(56) References Cited

U.S. PATENT DOCUMENTS

| | | | | |
|---|---|---|---|---|
| 6,826,895 B2* | 12/2004 | Iida | ................ | A01D 34/78 |
| | | | | 56/11.9 |
| 7,963,344 B2* | 6/2011 | Marcil | ................ | A01B 33/028 |
| | | | | 172/354 |
| 9,346,421 B2* | 5/2016 | Miyashiro | ................ | B62M 6/90 |
| 2004/0031632 A1 | 2/2004 | Kohda et al. | | |
| 2004/0157117 A1 | 8/2004 | Hisataka et al. | | |
| 2008/0098703 A1* | 5/2008 | Lucas | ................ | A01D 69/025 |
| | | | | 56/11.9 |
| 2008/0314660 A1* | 12/2008 | Davies | ................ | B60L 11/1822 |
| | | | | 180/65.31 |
| 2010/0275564 A1 | 11/2010 | Baetica et al. | | |
| 2011/0088362 A1 | 4/2011 | Rosa et al. | | |
| 2011/0285358 A1* | 11/2011 | Grant | ................ | F02B 63/04 |
| | | | | 320/150 |
| 2012/0317950 A1 | 12/2012 | Abe et al. | | |
| 2013/0164587 A1* | 6/2013 | Smith | ................ | H01M 2/1066 |
| | | | | 429/97 |
| 2013/0207460 A1* | 8/2013 | Kawatani | ................ | B60R 16/03 |
| | | | | 307/10.1 |
| 2013/0239533 A1* | 9/2013 | Juenger | ................ | A01D 69/02 |
| | | | | 56/11.9 |

OTHER PUBLICATIONS

Extended European Search Report, European Patent Application No. 17203834.1 dated Apr. 17, 2018, 8 pages.

* cited by examiner

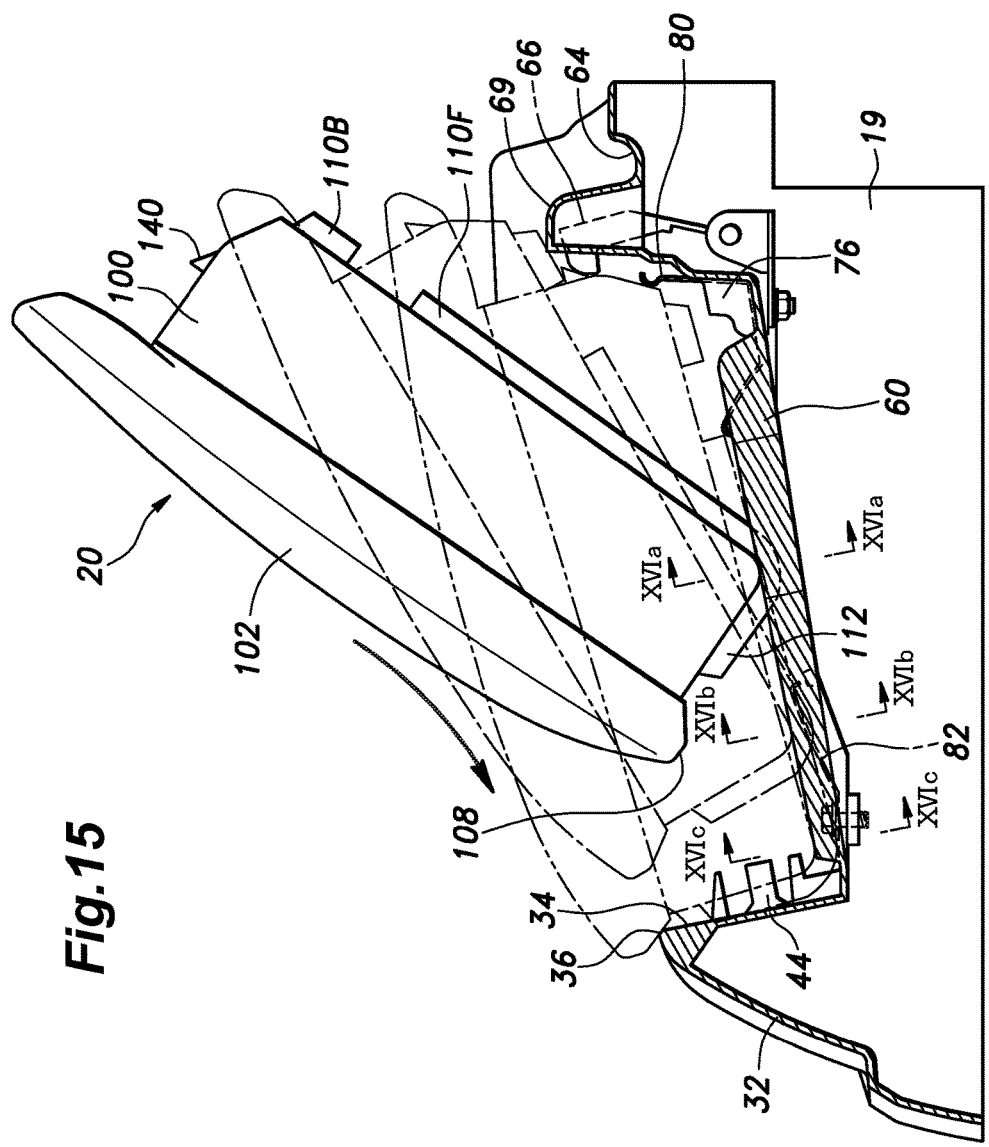

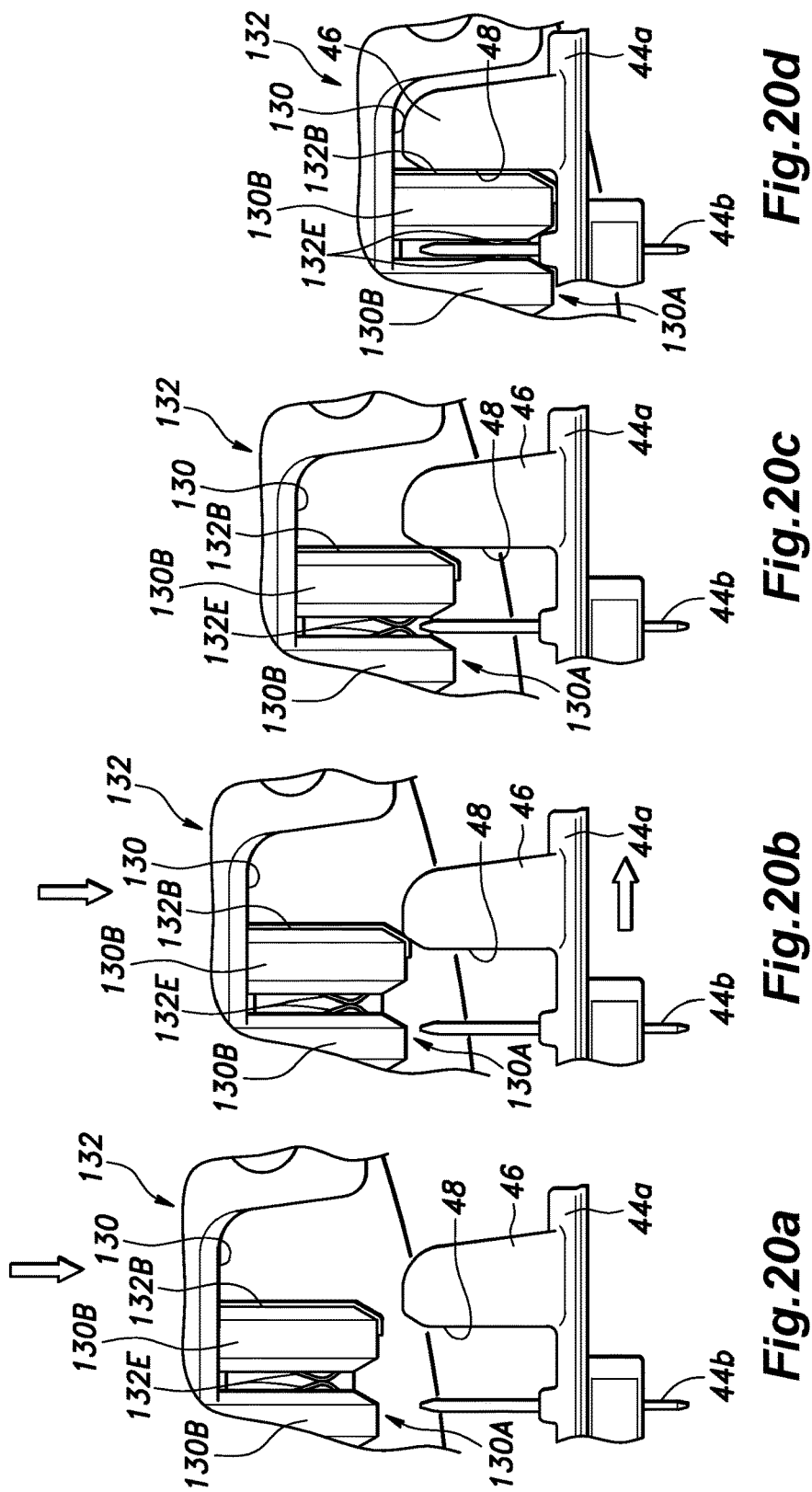

ELECTRIC POWER EQUIPMENT

TECHNICAL FIELD

The present invention relates to electric power equipment such as a lawn mower, and in particular to electric equipment provided with a rechargeable and removable battery.

BACKGROUND ART

Electric mowers as well as other forms of electric power equipment are often provided with a rechargeable and removable battery. JP2013-24A discloses an electric mower in which a battery is protected from the vibrations of an electric motor for driving a cutting blade. The electric motor is received in a recess formed in a cover that is placed on the main body so that the vibrations of the motor are not directly transmitted to the battery.

However, no matter how well the battery may be insulated from the vibrations of the electric motor, a relatively motion between the terminal pieces of the battery and the terminal pieces of the main body inevitably occurs during the operation of the electric mower, and the terminal pieces wear out over time. Also, during the servicing of the electric mower such as when cleaning the blade and the cutting deck, impacts may be transmitted to the battery, and this also contributes to the wear and damage of the terminal pieces.

SUMMARY OF THE INVENTION

In view of such a problem of the prior art, a primary object of the present invention is to provide an electric mower with a removable battery in which the battery is favorably insulated from vibrations.

To achieve such an object, the present invention provides electric power equipment, comprising: a battery tray (19) defining a battery receiving recess (40) having an open upper end, the battery receiving recess having a first end and a second end remote from the first end; a battery (20) configured to be removably received in the battery receiving recess, the battery having a first end and a second end corresponding to the first end and the second end of the battery receiving recess, respectively, a grip (104) being provided at the first end of the battery; an engagement portion (50) provided in a lower part of the second end of the battery receiving recess; a corresponding engagement portion (136) provided in a lower part of the second end of the battery, the corresponding engagement portion being configured to be engaged by the engagement portion of the battery receiving recess against a vertical movement; a first spring member (80) provided in a part of a bottom surface (42) of the battery receiving recess proximate to the first end thereof to urge the battery received in the battery receiving recess upward; and a latch member (66) provided in a part of the battery tray adjoining the first end of the battery receiving recess to selectively retain the battery from an upward movement.

The first spring member effectively dampens the vibrations that may be transmitted to the battery so that the wear of the connectors provided between the battery and the main body of the equipment and damage to the battery can be minimized. The first spring member lifts the battery when the latch member is unlatched from the battery so that the removal of the battery from the battery receiving recess can be facilitated.

The electric power equipment may further comprise a pair of guide rails (60) provided on the bottom surface of the battery receiving recess and extending from the first end to the second end of the battery receiving recess in a mutually spaced apart relationship, and a pair of guided members (110) provided on a lower surface of the battery and laterally spaced from each other so as to be engaged by a section of the respective guide rails as the second end of the battery is slid from an intermediate part of the bottom surface of the battery receiving recess to the second end of the battery receiving recess, a spacing between the guide rails progressively increasing from a first end of the section on a side of the first end of the battery receiving recess to a second end of the section on a side of the second end of the battery receiving recess, the spacing between the guide rails at the second end of the section being substantially equal to a corresponding spacing between the guided members.

Owing to the cooperation between the guide rails and the guided members, the lateral centering of the battery with respect to the battery receiving recess can be ensured in a simple manner.

Preferably, the guided members comprise a pair of guide ribs extending on the lower surface of the battery from the first end to the second end, extensions of the guide ribs extending along at least a part of an upright surface on the second end of the battery.

Thereby, the center of the battery can be ensured in a particularly favorable manner.

The electric power equipment may further comprise a second spring member (82) provided in a part of the bottom surface of the battery receiving recess proximate to the second end thereof to urge the battery received in the battery receiving recess upward.

Thereby, the vibrations that may be transmitted to the battery may be dampened in an even more favorable manner so that the wear of the connectors provided between the battery and the main body of the equipment and damage to the battery can be minimized. When a pair of guide rails are provided on the bottom surface of the battery receiving recess, the second spring member may be provided in a part of the bottom surface positioned between the guide rails.

The electric power equipment may further comprise a projection (122) projecting from the lower surface of the battery, and the projection is provided with a main part and a slope extending from an end of the main part on a side of the second end of the battery receiving recess toward the second end of the battery receiving recess, the second spring member engaging the main part of the projection when the battery is fully received in the battery receiving recess.

Thereby, the upward projecting height of the second spring member can be reduced so that the second spring member is prevented from being improperly caught by the battery during the handling of the battery, and the risk of damaging the second spring member can be minimized.

Preferably, the slope is formed by a plurality of ribs extending from the main part of the projection toward the second end of the battery receiving recess.

Thereby, the frictional force or the resistance against the movement of the battery relative to the second spring member can be minimized.

In a preferred embodiment of the present invention, the first spring member comprises a sheet spring including a middle part attached to the bottom surface of the battery receiving recess, a second end part (80*a*) extending from the middle part toward the second end of the battery receiving recess with an upward slant, and a first end part (80*b*) extending upright from the middle part, the first end part of the sheet spring being configured to urge the first end of the battery upward, the second end part of the sheet spring being configured to urge the battery toward the second end of the battery receiving recess.

The rear end of the sheet spring urges the battery forward so that the battery can be retained in the battery receiving recess in a favorable manner. Because the single sheet spring applies both the forward and upward biasing forces to the battery, the material cost and manufacturing cost can be minimized.

Preferably, the battery tray is provided with a lever (70) for unlatching the latch member from the battery.

Simply by operating the lever, the latch member can be unlatched, and the rear end of the battery is caused to pop up so that the removal of the battery may be facilitated. This can be accomplished in a particularly favorable manner when the second end part of the sheet spring is configured to raise and keep the first end of the battery out of engagement from the latch member once the latch member is unlatched.

In a particularly preferred embodiment of the present invention, a part of the battery tray defining a second end of the battery tray corresponding to the second end of the battery receiving recess is provided with an upward projection (36), and an upper second end part of the battery corresponding to the second end of the battery is provided with a nose (108) defining a slanted lower surface configured to rest upon the upward projection.

When placing the battery into the battery receiving recess, the nose of the battery may be rested on the upward projection of the battery tray. Thereby, the handling of the battery having a significant weight can be facilitated not only when placing the battery into the battery receiving recess but also when lifting the first end of the battery as an initial step of removing the battery from the battery receiving recess.

In a preferred embodiment of the present invention, the second end of the battery is provided with a battery side connector (132), and the second end of the battery receiving recess is provided with a power equipment side connector (44) configured to be electrically connected to the battery side connector when the battery is fully received by the battery receiving recess.

Thereby, simply by placing the battery into the battery receiving recess, the battery side connector and the power equipment side connector can be connected to each other in an effortless manner.

BRIEF DESCRIPTION OF THE DRAWINGS

FIG. 15 is a side view showing the battery in an early phase of being placed into the battery receiving recess;
FIG. 20a to FIG. 20d are fragmentary bottom views of the connectors in the process of being connected to each other.

DESCRIPTION OF THE PREFERRED EMBODIMENT(S)

An electric mower embodying the present invention is described in the following with reference to FIGS. 1 to 20.

Figure 1:
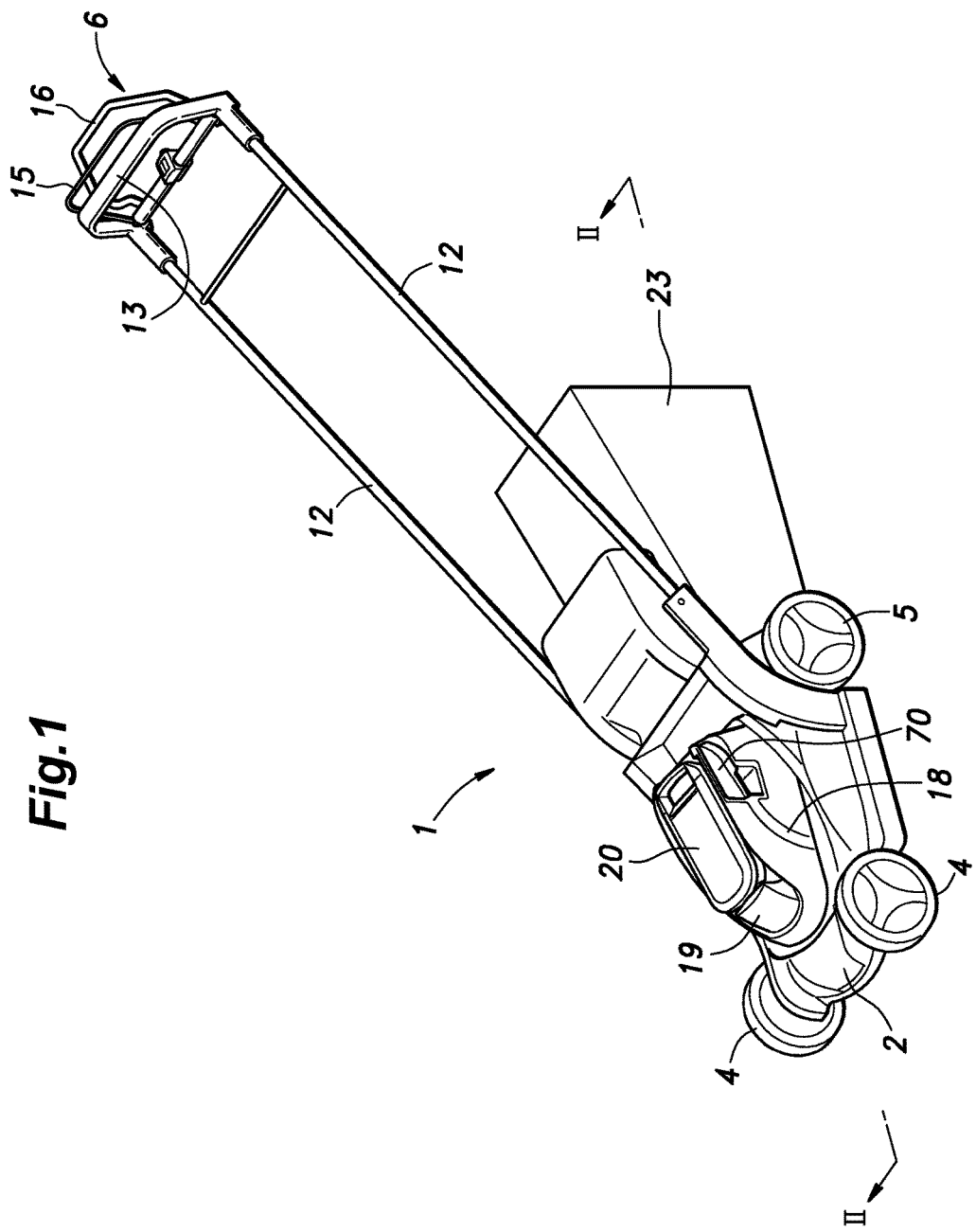
FIG. 1 is a perspective view of an electric mower according to the present invention.
Figure 2:
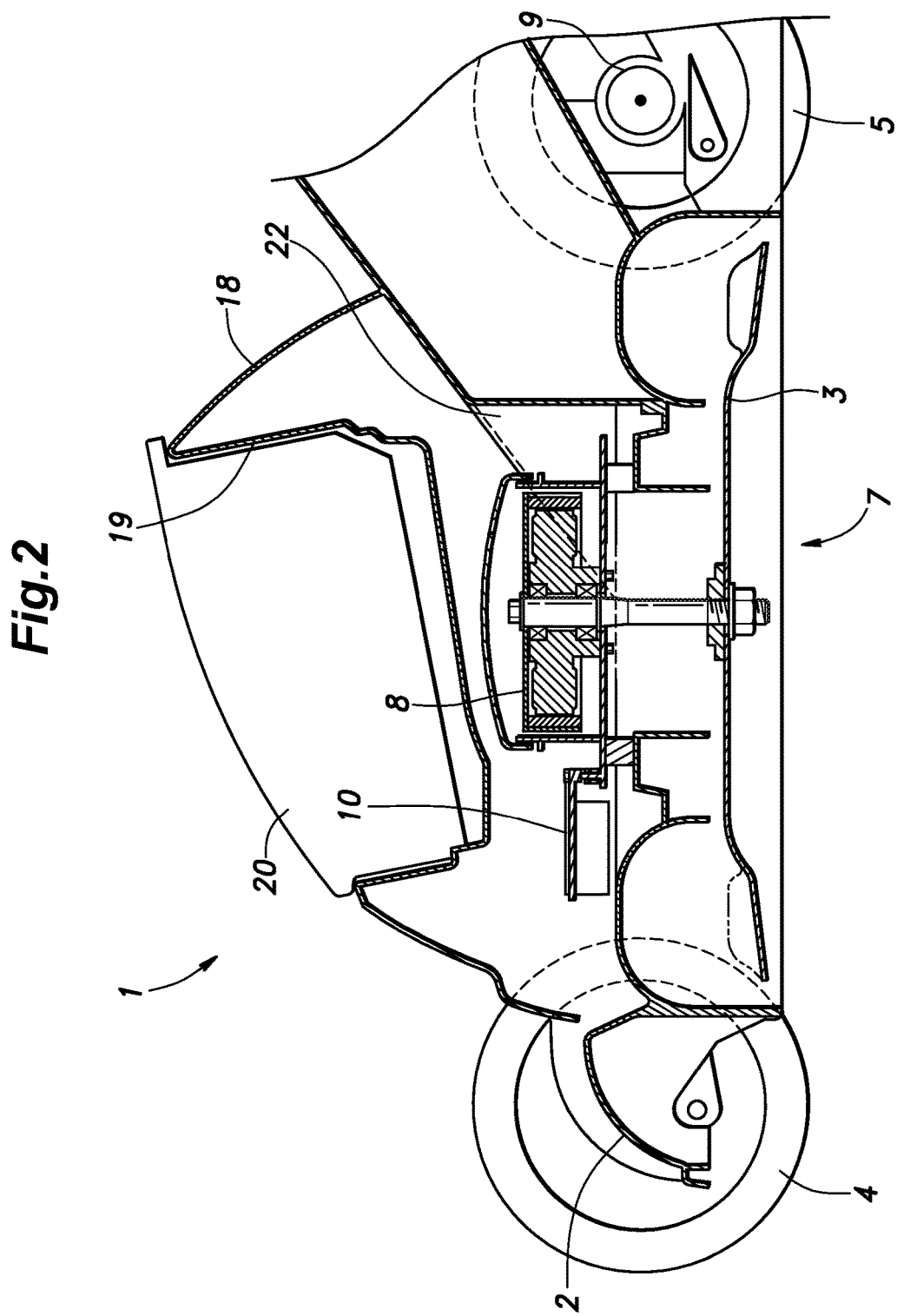
FIG. 2 is a sectional view taken along line II-II of FIG. 1.

As shown in FIGS. 1 and 2, the electric mower 1 according to the present embodiment includes a main body 2, a blade 3 rotatably supported in a cavity 7 defined in a lower part of the main body 2, a pair of front wheels 4 supported by the main body 2, a pair of rear wheels 5 supported by the main body 2, and a handle 6 extending rearward and upward from the main body 2. A blade motor 8 having the blade 3 coupled to an output shaft thereof and a travel motor 9 for driving the rear wheels 5 are supported by the main body 2. Both the blade motor 8 and the travel motor 9 consist of electric motors, and the main body 2 is provided with a control unit 10 for controlling these motors.

The handle 6 is provided with a pair side rods 12 extending rearward and upward from either side end of a rear part of the main body 2, and a cross rod 13 extending between the rear ends of the side rods 12. The cross rod 13 of the handle 6 is provided with a travel lever 15 for operating the travel motor 9 and a blade lever 16 for operating the blade motor 8.

The blade motor 8, the travel motors 9, and the control unit 10 are provided on an upper part of the main body 2, and covered by an upper cover 18. A battery tray 19 defining a battery receiving recess 40 is formed in the upper cover 18 to removably receive a battery 20 for supplying electric power to the motors 8 and 9 and the control unit 10.

A chute 22 extends rearward from the cavity 7 to a rear end part of the main body 2, and a grass bag 23 is attached to the rear end part of the main body 2 so as to close a rear opening of the chute 22. The grass cut by the blade 3 is discharged rearward from the cavity 7 through the chute 22 and collected in the grass bag 23.

Figure 3:
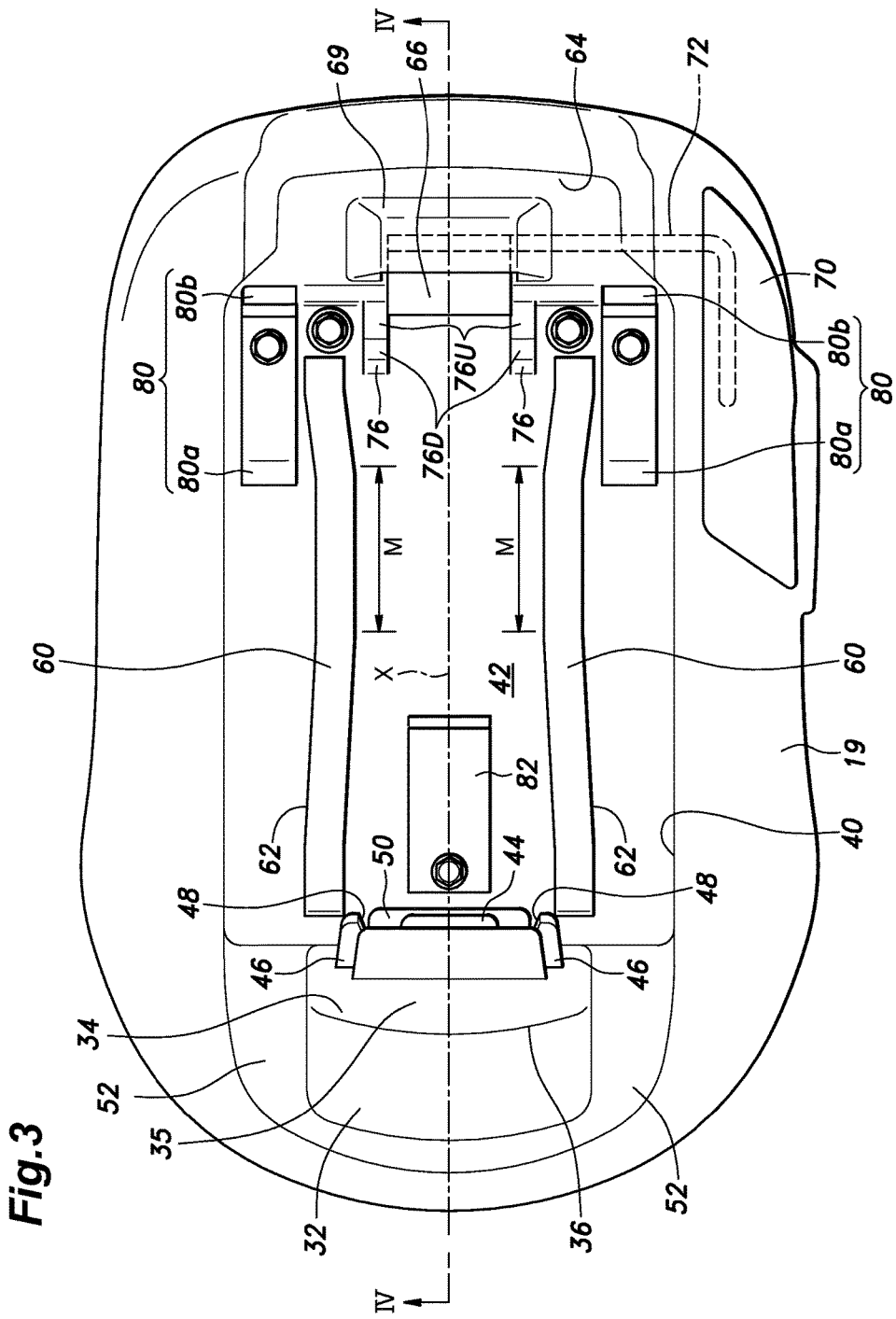
FIG. 3 is a plan view of a battery tray of the electric mower.
Figure 4:
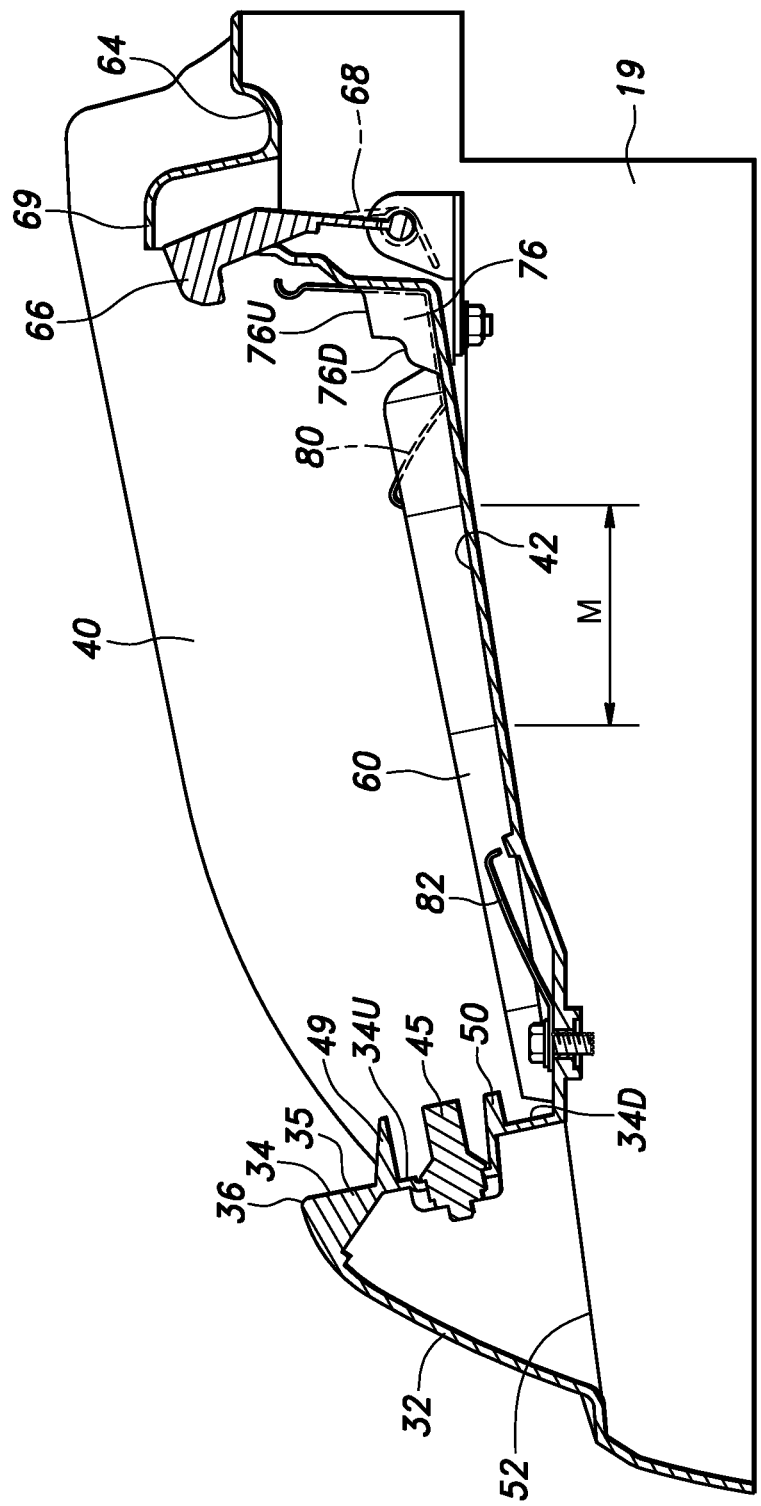
FIG. 4 is a sectional view taken along line IV-IV of FIG. 3.

As shown in FIGS. 2 to 4, the battery receiving recess 40 defined by the battery tray 19 is provided with an open side facing upward. The battery receiving recess 40 has a substantially rectangular periphery somewhat elongated in the fore and aft direction, and is symmetrical with respect to a central vertical plane X extending in the fore and aft direction.

Figure 10:
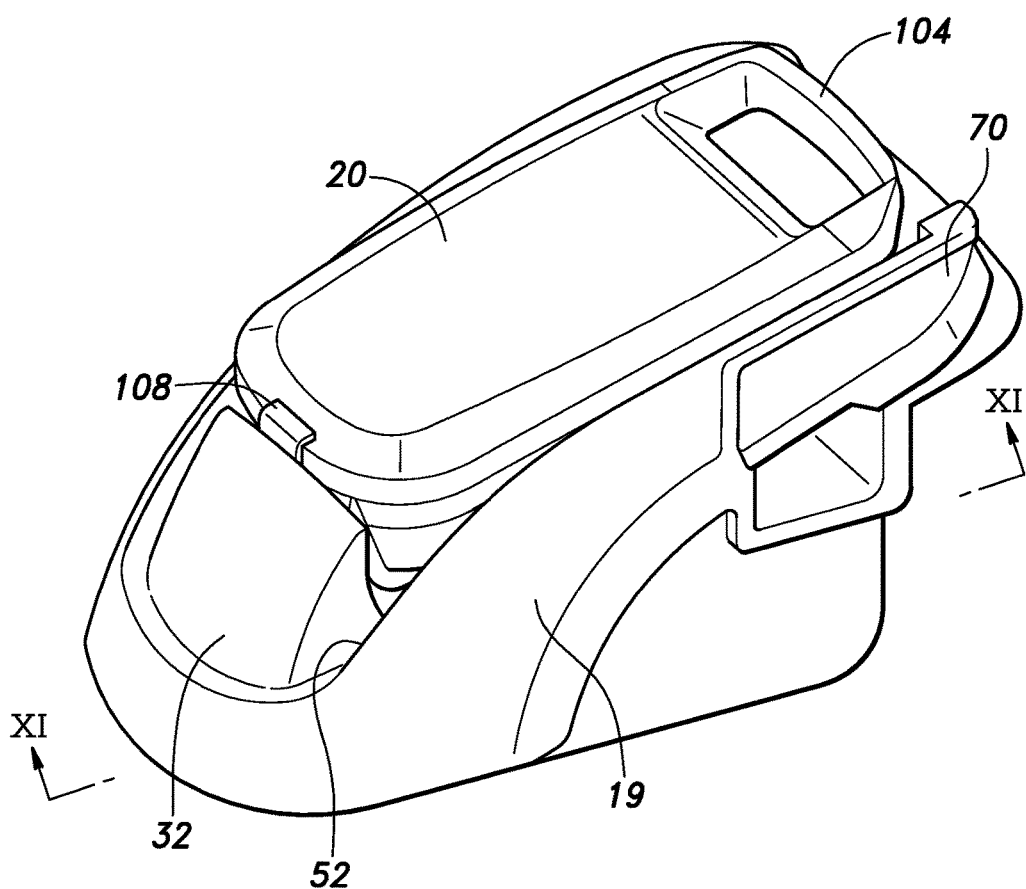
FIG. 10 is a perspective view of the battery received in a battery receiving recess of the mower.

A front part 32 of the upper cover 18 projects upward, and includes a front wall defining a streamlined front end of the mower main body 2 and a rear wall extending substantially vertically (with a forward slant) and defining an abutting surface 34 for supporting a front end of the battery 20 as will be discussed hereinafter. The front part 32 of the upper cover 18 is provided with a pair of side walls extending between the front wall and the rear wall, and each side wall is slightly spaced from the opposing inner wall of the battery tray 19 so as to define a slot 52 extending in the fore and aft direction (FIG. 10). The upper end of the abutting surface 34 is smoothly connected to the front surface of the front part 32 via a rounded corner 36 (an upward projection) in side view.

The battery receiving recess 40 for receiving the battery 20 is thus defined by the abutting surface 34, a pair of side wall surfaces, a rear wall surface and a bottom wall surface 42. The bottom wall surface 42 is slightly slanted toward the front end thereof. The battery receiving recess 40 and the bottom wall surface 42 are also symmetric relative to the central vertical plane X.

The front wall of the battery receiving recess 40 is provided with a mower side connector 44 in a central part thereof.

Figure 5:
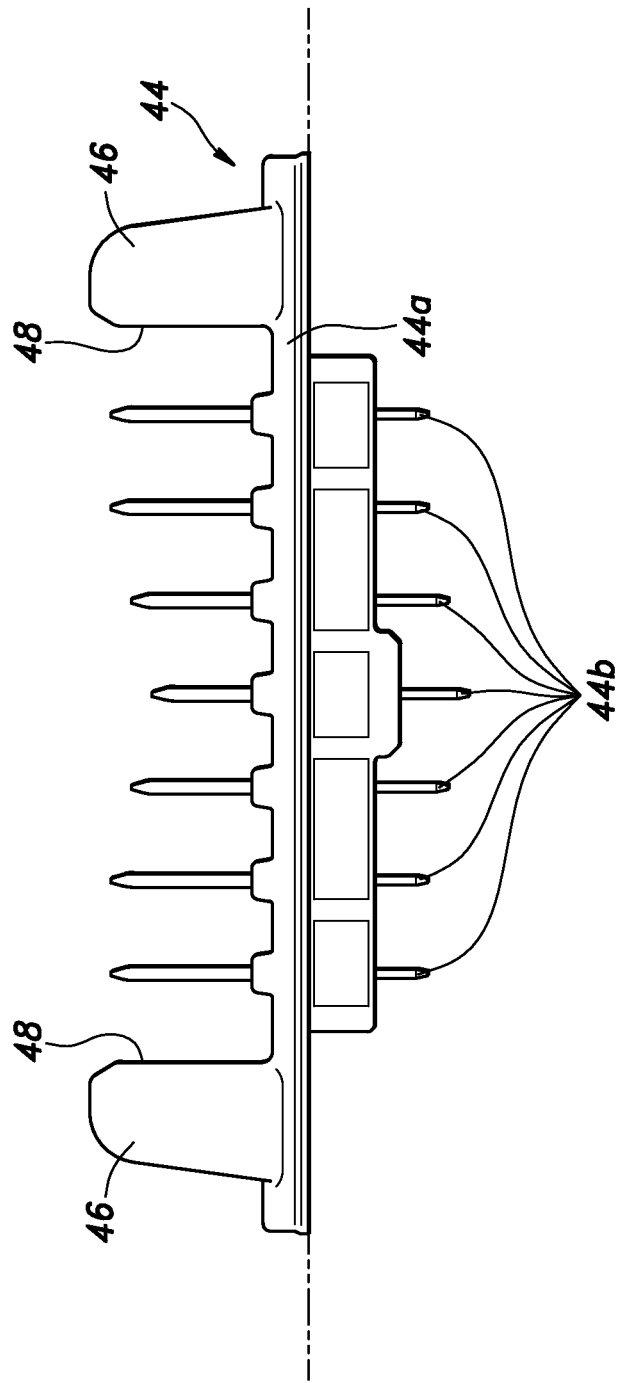
FIG. 5 is a plan view of a mower side connector.
Figure 6:
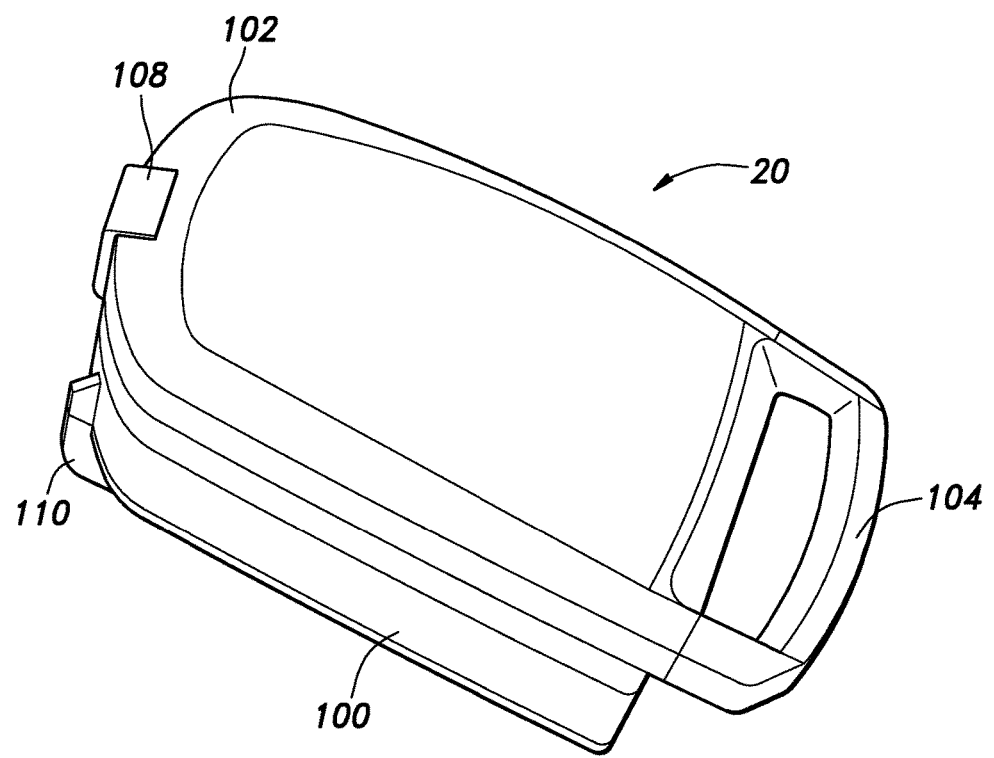
FIG. 6 is a perspective view of a battery of the electric mower.

As shown in FIG. 5, the mower side connector 44 includes a base member 44a which is made of insulating material and has a laterally elongated rectangular shape. The base member 44a is essentially a plate member which is supported by the rear wall of the front part 32 so as to be slightly movable in the lateral direction, but is otherwise fixed in position relative to the rear wall of the front part 32 (a floating support). A plurality (seven, in the illustrated embodiment) of power receiving terminal pieces 44b are passed through the base member 44a and arranged in a single row at a regular interval in the lateral direction.

A pair of terminal guide projections 46 project rearward from either lateral end of the base member 44a, and mutually opposing surfaces of the terminal guide projections 46 are formed as guide surfaces 48 which are rounded or tapered in free end parts thereof.

As shown in FIG. 4, a vertically middle part of the rear wall of the front part 32 is provided with an upwardly facing and laterally extending shoulder surface so that the abutting surface 34 includes an upper part 34U and a lower part 34D, the lower part 34D being positioned more rearward than the upper part 34U so as to define the upwardly facing shoulder surface. A laterally extending rib 50 projects rearward so as to define an upper surface which is an extension of the shoulder surface defined between the lower part 34D and the upper part 34U of the abutting surface 34. The terminal pieces 44b are positioned slightly above the shoulder surface. A laterally extending rib 49 similar to the rib 50 projects rearward from a part of the abutting surface 34 positioned slightly above the terminal pieces 44b.

As shown in FIG. 4, the bottom wall surface 42 is formed in a substantially rectangular shape somewhat elongated in the fore and aft direction, and slants downward toward the front end thereof. Further, the bottom surface of the slots 52 is connected continuously to the bottom wall surface 42 so that water that may be deposited in the battery receiving recess 40 can be readily drained from the battery receiving recess 40 via the slots 52.

As shown in FIG. 3, the bottom wall surface 42 is provided with a pair of guide rails 60 extending in the fore and aft direction from a vicinity of the front end of the bottom wall surface 42 to a vicinity of the rear end of the bottom wall surface 42. The left and right guide rails 60 are mirror images of each other about the central vertical plane X in plan view, and an outer side surface (facing outward) of each guide rail 60 serves as a guide surface 62. The two guide rails 60 are parallel to each other in an intermediate region M of the bottom wall surface 42 with respect to the fore and aft direction. The parts of the guide rails 60 in a front end region of the bottom wall surface 42 progressively spread apart toward the front ends thereof, and the parts of the guide rails 60 in a rear end region of the bottom wall surface 42 also progressively spread apart toward the rear ends thereof. More importantly, the guide surfaces 62 of the two guide rails 60 are parallel to each other in the intermediate region M, progressively spread apart toward the front in the front end region, and progressively spread apart toward the rear in the rear end region.

As shown in FIG. 4, the upper surfaces of the guide rails 60 both have a downward slope toward the front ends thereof in a similar manner as (in parallel with) the bottom wall surface 42.

As shown in FIG. 4, the rear wall of the battery receiving recess 40 is centrally provided with an opening, and a latch member 66 is passed through the opening. The lower end of the latch member 66 which is positioned outside of the rear wall is pivotally supported at the base end around a laterally extending pivot center line, and the upper end of the latch member 66 which is positioned inside of the rear wall is provided with a locking claw projecting forward. The latch member 66 is resiliently urged by a torsion coil spring 68 provided at the base end of the latch member 66 in a direction to urge the locking claw in the forward direction. A rear recess 64 is formed in a part of the upper cover 18 immediately behind the latch member 66. A rear part 69 of the upper cover 18 projects upward from the rear recess 64 and is connected to the rear wall of the battery tray 19.

As shown in FIGS. 1 and 3, a battery removal lever 70 is provided on a rear part of an upper left side part of the upper cover 18 adjoining a rear end of the battery tray 19. The battery removal lever 70 is connected to the latch member 66 via a link mechanism 72 so that the locking claw at the upper end of the latch member 66 can be moved rearward against the biasing force of the torsion coil spring 68 by pressing down a rear end part of the battery removal lever 70.

As shown in FIGS. 3 and 4, a pair of battery supporting protrusions 76 elongated in the fore and aft direction project from a rear end part of the bottom wall surface 42 (the bottom surface of the battery receiving recess 40) in a laterally spaced apart relationship in symmetry about the central vertical plane X. The rear end of each battery supporting protrusion 76 is connected to the rear wall of the battery tray 19. The battery supporting protrusions 76 extend inside the guide rails 60 in a slightly overlapping relationship in side view. Each battery supporting protrusion 76 has a stepped upper surface including a high part 76U adjacent to the rear end thereof and a low part 76D in the front end thereof. The high part 76U is substantially at the same height as the guide rails 60, and the low part 76D is at about one half of the height of the guide rails 60.

A pair of first sheet spring members 80 (first spring members) are provided on either side of rear end parts of the guide rails 60. The first sheet spring members 80 are each attached to the bottom wall surface 42 by a screw in a middle part thereof, and provided with a front end 80a expending obliquely upward toward the front and a rear end 80b extending upright. Therefore, when the battery 20 is received in the battery receiving recess 40, the front ends 80a of the first sheet spring members 80 urge the battery 20 upward, and the rear ends 80b of the first sheet spring members 80 urge the battery 20 forward.

A second sheet spring member 82 (second spring member) is provided centrally in a front end part of the bottom wall surface 42 of the battery receiving recess 40. The second sheet spring member 82 is elongated in the fore and aft direction, and is provided with a front end attached to the bottom wall surface 42 by a screw and a rear end extending upward and rearward toward the rear. The second sheet spring member 82 fully overlaps with the guide rails 60 in side view as shown in FIG. 4.

As shown in FIG. 1, the battery 20 is substantially rectangular in shape, and slightly elongated in the fore and aft direction. The battery 20 is essentially symmetric about a central vertical plane Y extending in the fore and aft direction. The central vertical plane Y of the battery 20 coincides with the central vertical plane X of the mower main body 2 when the battery 20 is received in the battery receiving recess 40.

Figure 8:
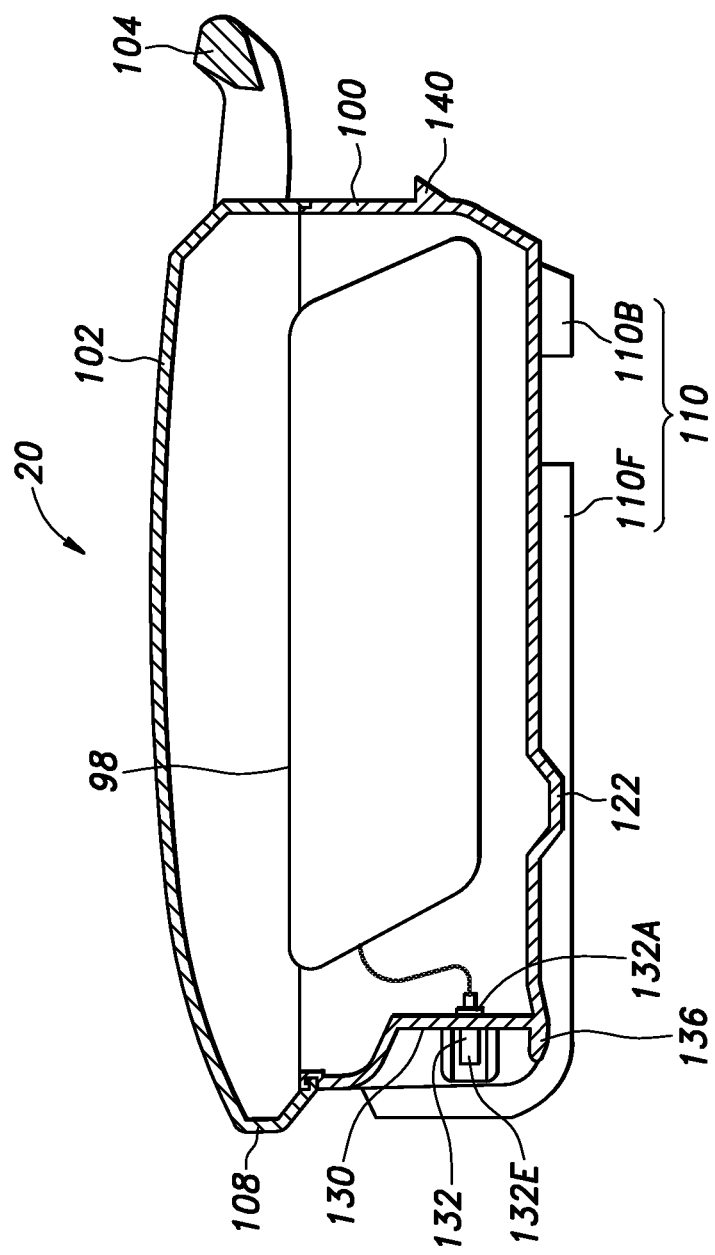
FIG. 8 is a sectional view taken along line VIII-VIII of FIG. 7.
Figure 9:
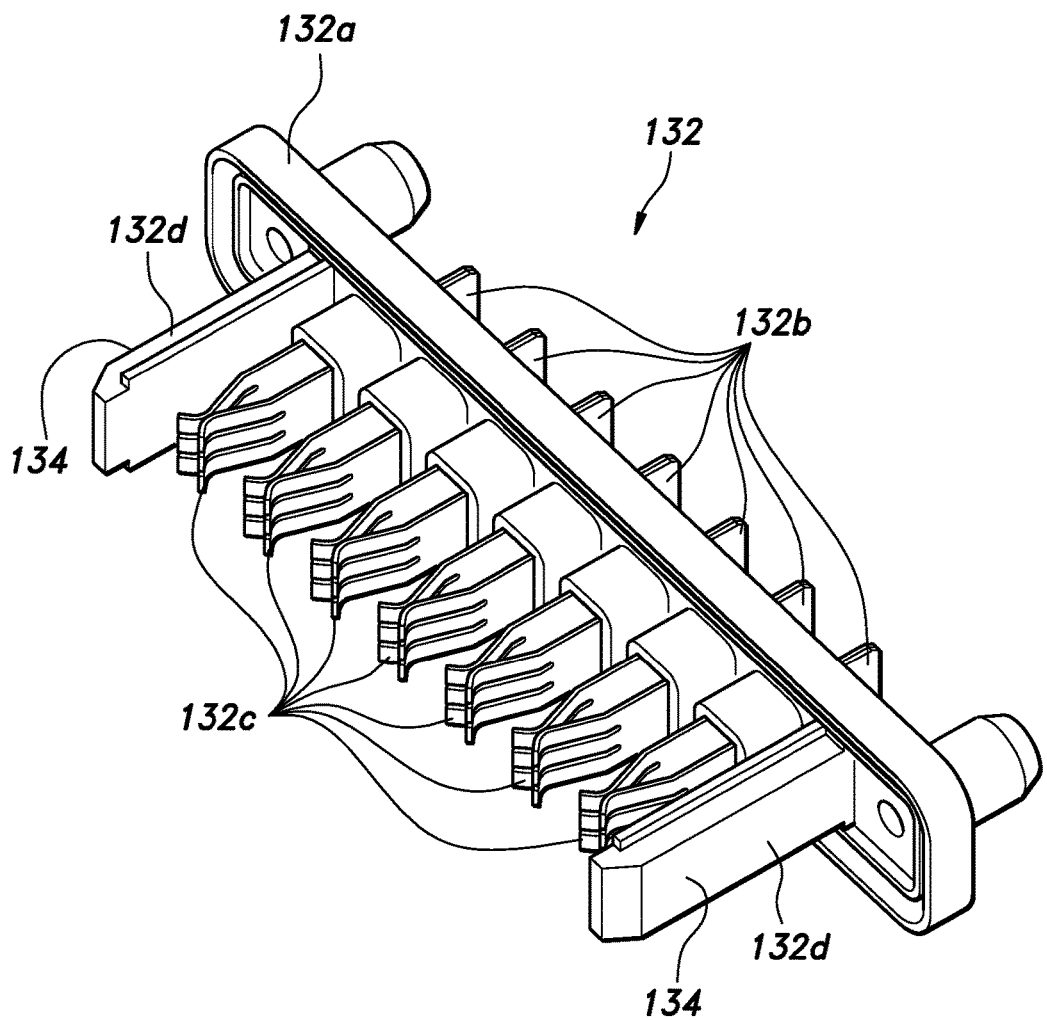
FIG. 9 is a perspective view of a battery side connector.

As shown in FIG. 8, the battery 20 includes a battery housing 100 formed as a rectangular container with an open top, and accommodating battery cells 98 therein.

The battery 20 further includes a battery cover 102 closing the open upper end of the battery housing 100. The rear end of the battery cover 102 is provided with a grip 104 extending rearward and forming a loop. The upper front end of the battery cover 102 protrudes forward in side view which is now referred to as nose 108. In particular, the nose 108 presents a smooth protrusion projecting forward, and overhangs the front end part of the battery housing 100.

Figure 7:
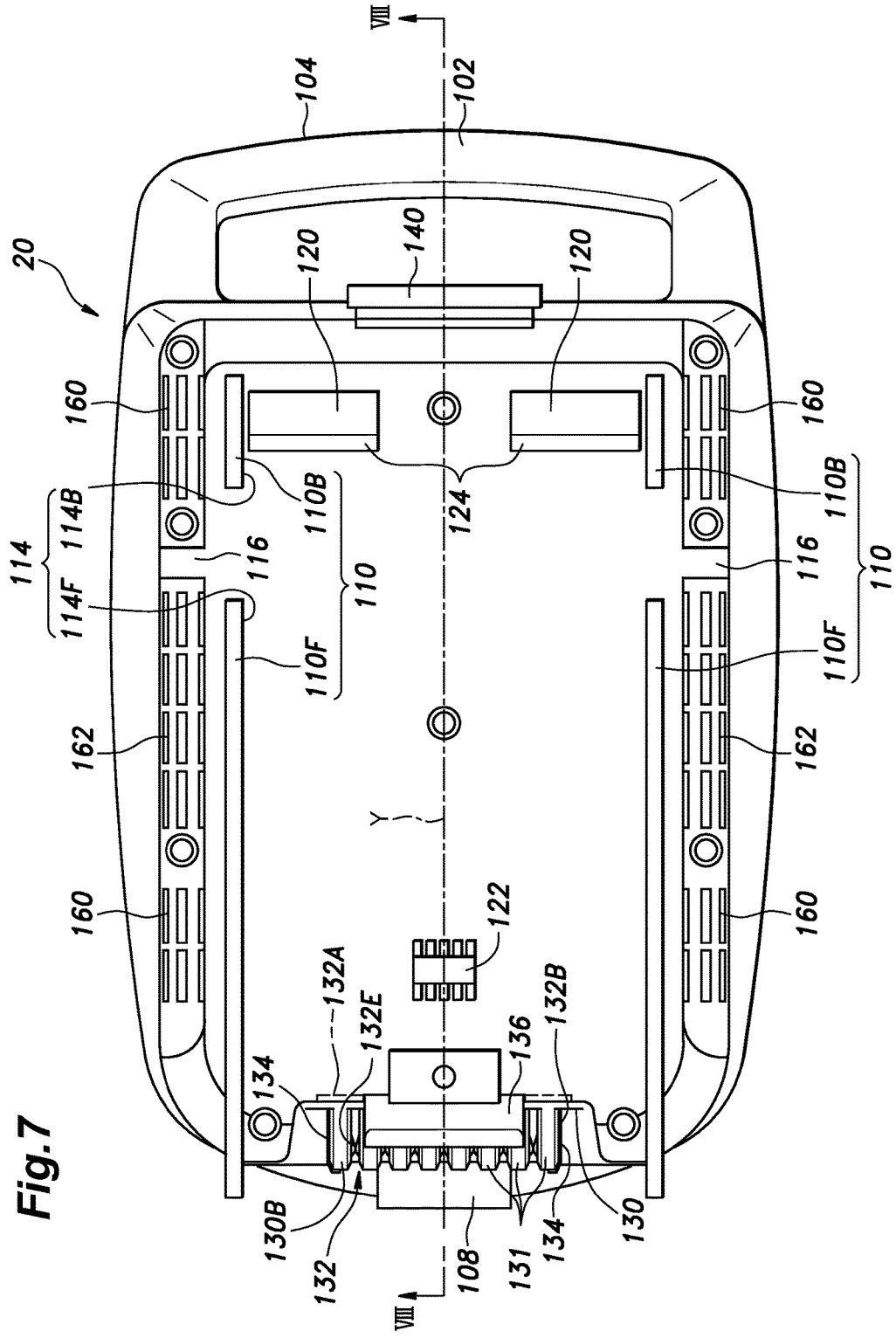
FIG. 7 is a bottom view of the battery.

As shown in FIGS. 7 and 8, the lower surface of the battery housing 100 is provided with a pair of guide ribs 110 extending linearly in the fore and aft direction in parallel to each other. The guide ribs 110 are positioned so that the inner surfaces of these guide ribs 110 (that oppose each other) serve as guided surfaces 114 that cooperate with the respective guide surfaces of the guide rails 60. There is a break in each guide rib 110 in a rear part thereof, separating the guide rib 110 into a front guide rib 110F and a rear guide rib 110B which are aligned to each other. Each rear guide rib 110B extends between the break and a rear edge of the bottom wall of the battery housing 100. Each front guide rib 110F extends from the break to the front edge of the bottom wall of the battery housing 100, and to an upper edge of the front wall of the battery housing 100 in a continuous manner. Thus, each front guide rib 110F includes a horizontal section extending along the bottom wall of the battery housing 100 and a vertical section extending along the front wall of the battery housing 100 in a smooth continuation.

The break in each guide rib 110 is positioned and dimensioned so that the corresponding first sheet spring member 80 does not interfere with the guide rib 110 when the battery 20 is placed into and removed from the battery receiving recess 40. Each guide rib 110 has a substantially uniform height over the entire length thereof (including the front guide rib 110F and the rear guide rib 110B), the height thereof being smaller than the height of the guide rails 60.

A pair of first bottom surface engaging portions 120 project from a rear end part of the lower surface of the battery 20 laterally next to each other in a symmetric manner about the central vertical plane Y, and are positioned between the two rear guide ribs 110B. The front end of each first bottom surface engaging portion 120 consists of a sloping surface, and the rear end of the first bottom surface engaging portion 120 consists of an upright wall surface. The main part of each first bottom surface engaging portion 120 defines a planar horizontal surface. The height of the first bottom surface engaging portions 120 is substantially equal to that of the rear guide ribs 110B.

These first bottom surface engaging portions 120 are configured to be supported by the upper surfaces of the lower parts 76U of the battery supporting protrusions 76, respectively, when the battery 20 is fully received in the battery receiving recess 40.

A second bottom surface engaging portion 122 having a rectangular shape in plan view projects centrally from a front end part of the lower surface of the battery 20. The second bottom surface engaging portion 122 includes a sloping front wall, a planar and horizontal main part and a sloping rear wall, and the main part has a substantially same height as the guide ribs 110. The sloping front wall and the sloping rear wall are defined by a plurality of ribs extending in the fore and aft direction. The second bottom surface engaging portion 122 is positioned so that the rear end of the second sheet spring member 82 engages the planar main part of the second bottom surface engaging portion 122 when the battery 20 is fully received in the battery receiving recess 40.

As shown in FIG. 8, a lower part of the front wall of the battery housing 100 is centrally provided with a recess 130 which is recessed rearward (or inward). The rear wall (bottom wall) of the recess 130 is provided with a plurality of small rectangular openings arranged laterally, and projections 131 project from the respective parts of the rear wall of the recess 130 located between the adjoining rectangular openings.

A battery side connector 132 is attached to the bottom wall of the recess 130 from inside the battery housing 100. The battery side connector 132 includes a base member 132a made of electrically insulating material and having the shape of a laterally elongated plate member, and a plurality of terminal pieces 132b passed through the base member 132a and arranged in a single row along the length of the base member 132a. The base member 132a is attached to the rear wall of the recess 130 from behind. Front end 132c of each terminal piece 132b consists of a pair of sheet springs configured to resiliently accept the corresponding one of the terminal pieces 44b of the mower side connector 44 between the sheet springs. The rear end of each terminal piece 132b is formed as a connecting piece to which a lead wire is connected by soldering (although not shown in the drawings). The front ends 132c of the terminal pieces 132b are passed through the respective rectangular openings in the rear wall of the recess 130.

A pair of guide pieces 132d extend forward from either lateral end of the base member 132a, and are passed through corresponding openings in the rear wall of the recess 130. An outer surface of each guide piece 132d defines a guide surface 134. The guide pieces 132d extend beyond the free ends of the front ends 132c of the terminal pieces 132b, and extend from the rear wall of the recess 130 by about a same length as the projections 131. The outer side of the free end of each guide piece 132d is chamfered. In other words, the free end of each guide surface 134 is formed as a sloping surface.

A lower part of the front end of the battery housing 100 is provided with a front engagement portion 136 consisting of a rib projecting forward, and extending along the lower edge of the front part of the battery housing 100. The front engagement portion 136 substantially vertically aligns with the battery side connector 132 with a certain spacing defined between the projections 131 and the front engagement portion 136.

A rear engagement portion 140 projects rearward from the rear end of the battery housing 100, and defines an upwardly facing and laterally elongated shoulder surface. In particular, the rear engagement portion 140 is configured to be engaged by the locking claw of the latch member 66 as will be discussed hereinafter.

The lower surface of the battery housing 100 is connected to each side surface of the battery housing 100 via a smooth curved contour in a continuous manner. A laterally extending rib 116 extends in this curved region between the lower surface and each side surface of the battery housing 100 in a position corresponding to the break between the front guide rib 110F and the rear guide rib 110 on the corresponding side.

The curved region between the lower surface and each side surface of the battery housing 100 is further provided with a plurality of inlet openings 160 and outlet openings 162 for introducing and removing external air into and out of the battery housing 100, respectively, for cooling the battery cells 98 therein.

The mode of operation of the electric mower 1, in particular the mode of installing and removing the battery 20 into and out of the battery receiving recess 40 of the battery tray 19 is described in the following.

During normal operation of the electric mower 1, the battery 20 is received in the battery receiving recess 40 of the battery tray 19 as shown in FIG. 1.

Figure 11:
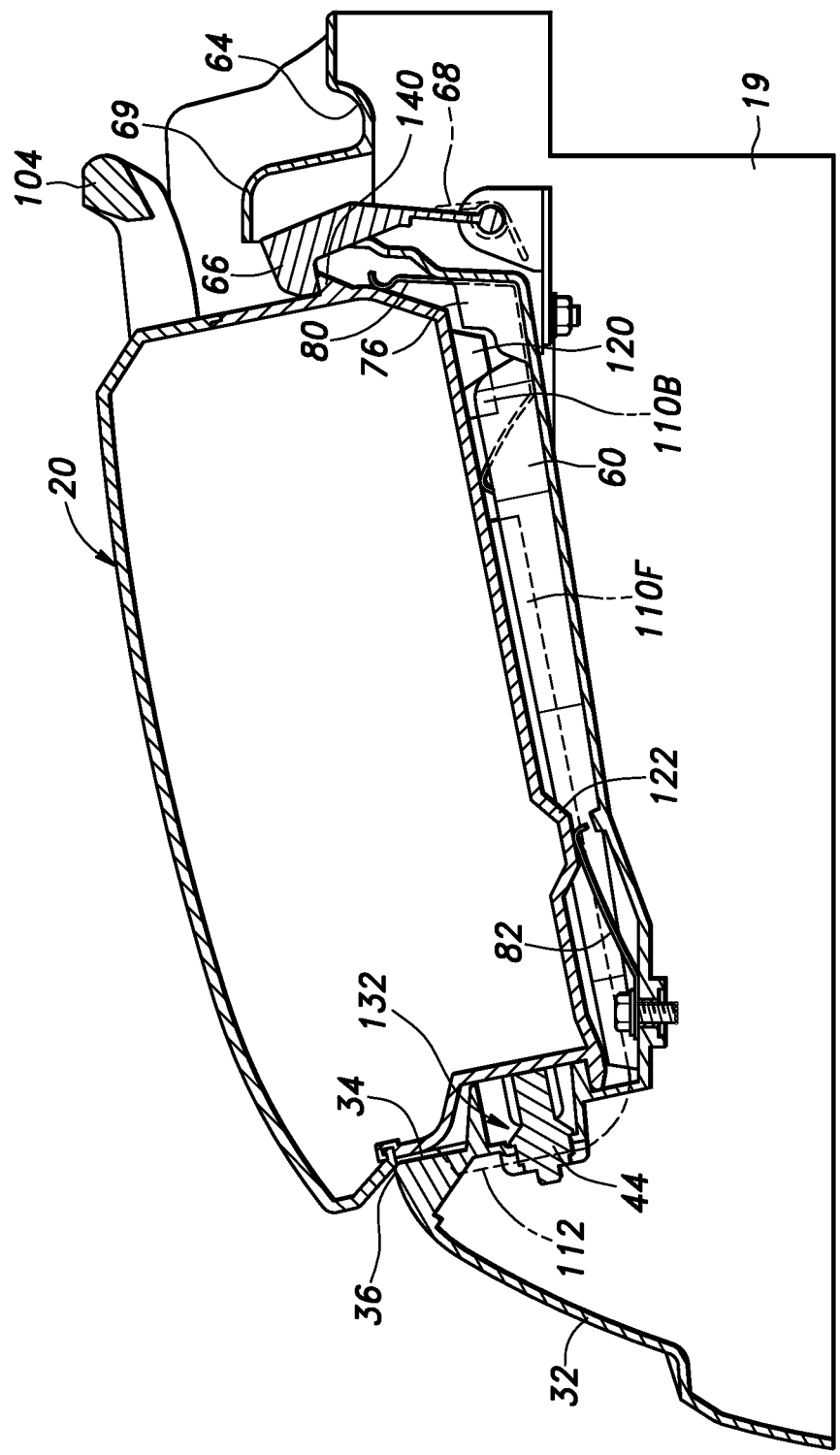
FIG. 11 is a sectional view taken along line XI-XI of FIG. 10.
Figure 12:
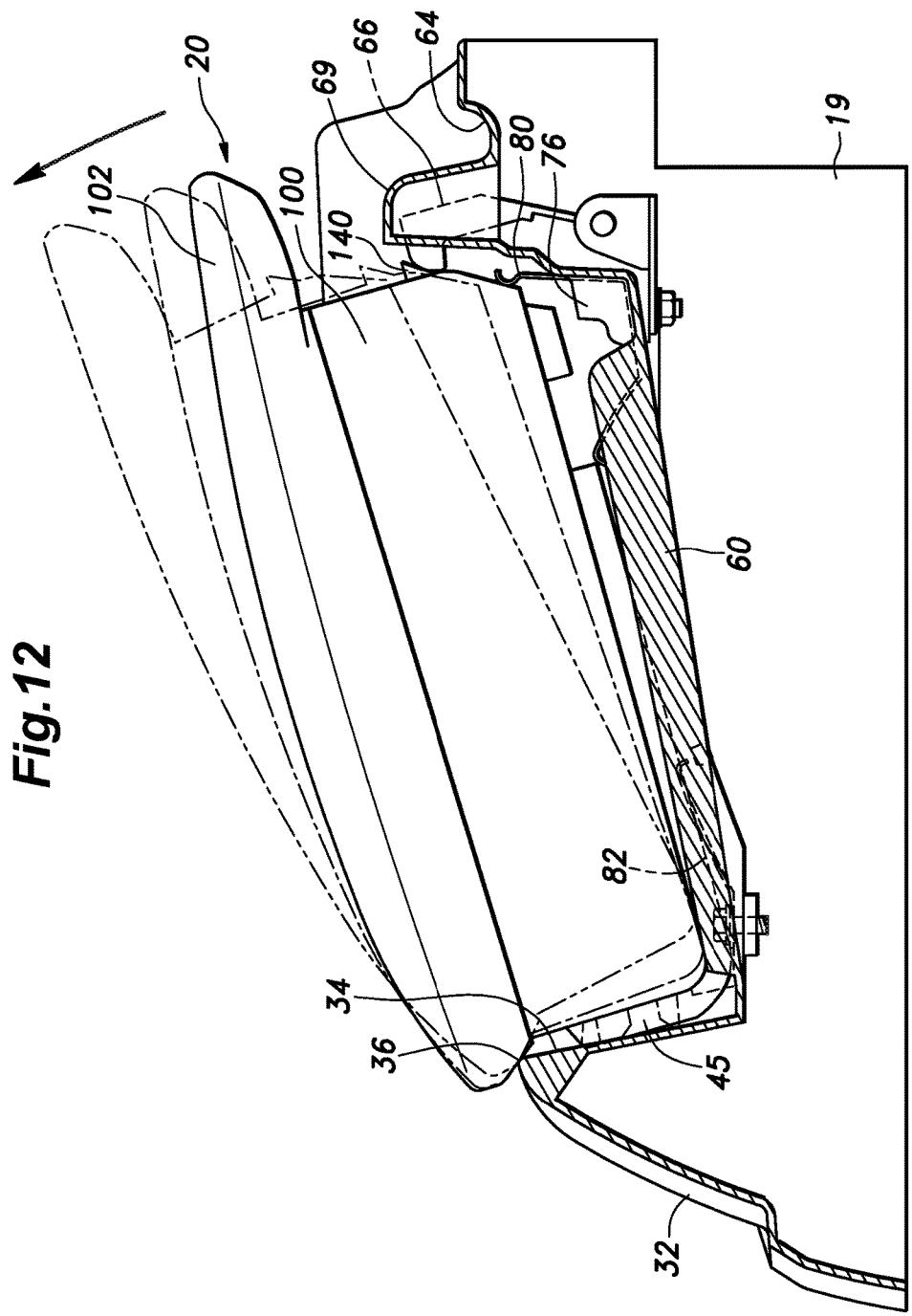
FIG. 12 is a side view showing the battery as being removed from the battery receiving recess.

As shown in FIGS. 10 and 11, when the battery 20 is received in the battery receiving recess 40, the grip 104 of the battery 20 is received in the rear recess 64. At this time, the lower surface of the battery housing 100 abuts the upper surface of the guide rails 60, and the outer surfaces or the guide surfaces 62 of the guide rails 60 are interposed between the guided surfaces 114 of the guide ribs 110. The battery side connector 132 is electrically connected to the mower side connector 44.

Further, the front ends 80a of the first sheet spring members 80 abut the lower surface of the battery to urge the battery 20 upward, and the rear ends 80b of the first sheet spring members 80 abut the rear end surface of the battery housing 100 to urge the battery 20 forward. The second sheet spring member 82 abuts the lower surface of the main part of the second bottom surface engaging portion 122 to urge the battery 20 upward. The front engagement portion 136 of the battery housing 100 is engaged by the rib 50 projecting from the rear wall of the front part 32. Thus, the battery 20 is firmly retained in the battery receiving recess 40.

When the battery 20 becomes low in charge, the battery 20 is removed by a user.

At this time, the user depresses the battery removal lever 70, and this causes the locking claw of the latch member 66 to move rearward against the spring force of the torsion coil spring 68, and disengages the rear engagement portion 140 of the battery housing 100. As a result, the rear portion of the battery 20 pops up under the spring force of the front ends of the first sheet spring members 80.

The user then holds the grip 104 of the battery 20 and lifts the rear end of the battery 20 until the rear end of the battery 20 clears the rear edge of the battery receiving recess 40. At this time, the underside of the nose 108 of the battery 20 rolls over the rounded corner 36. As a result, the front engagement portion 136 of the battery housing 100 is disengaged from the rib 50 projecting from the rear wall of the front part 32.

Figure 13:
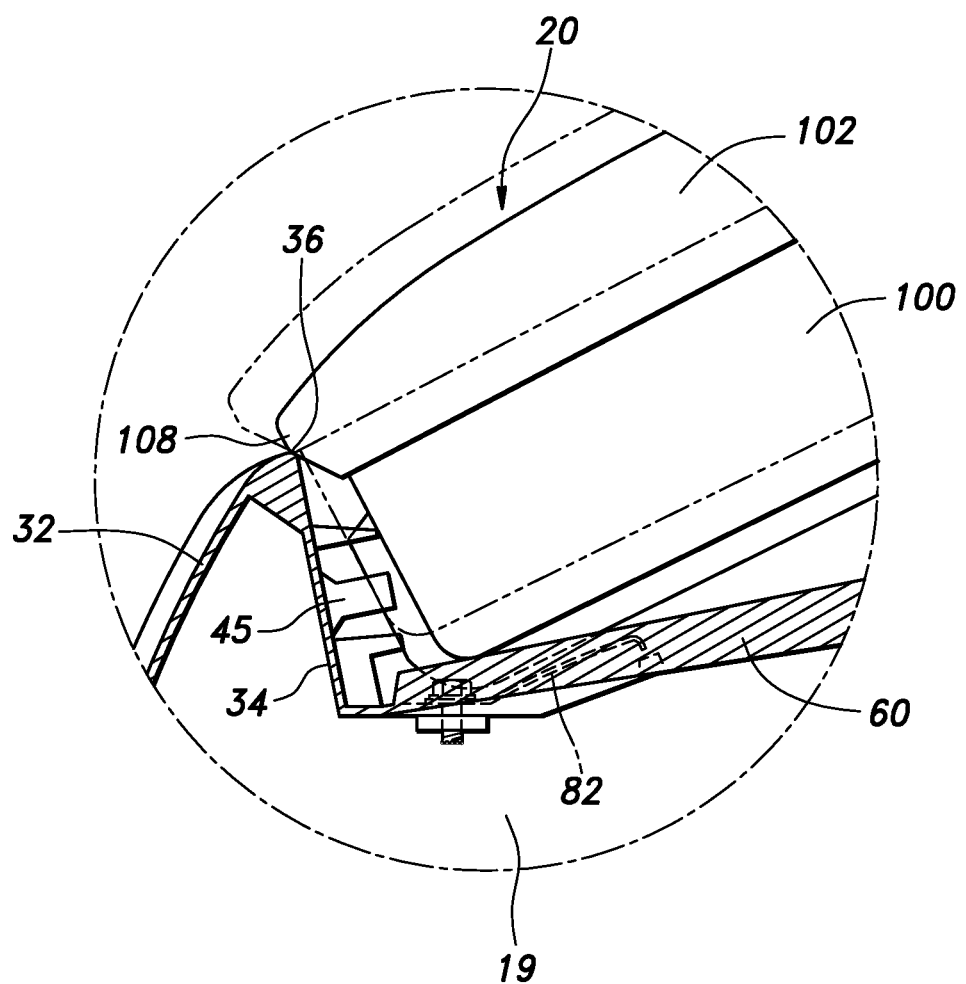
FIG. 13 is a fragmentary side view showing a front end part of the battery as being removed from the battery receiving recess.
Figure 14:
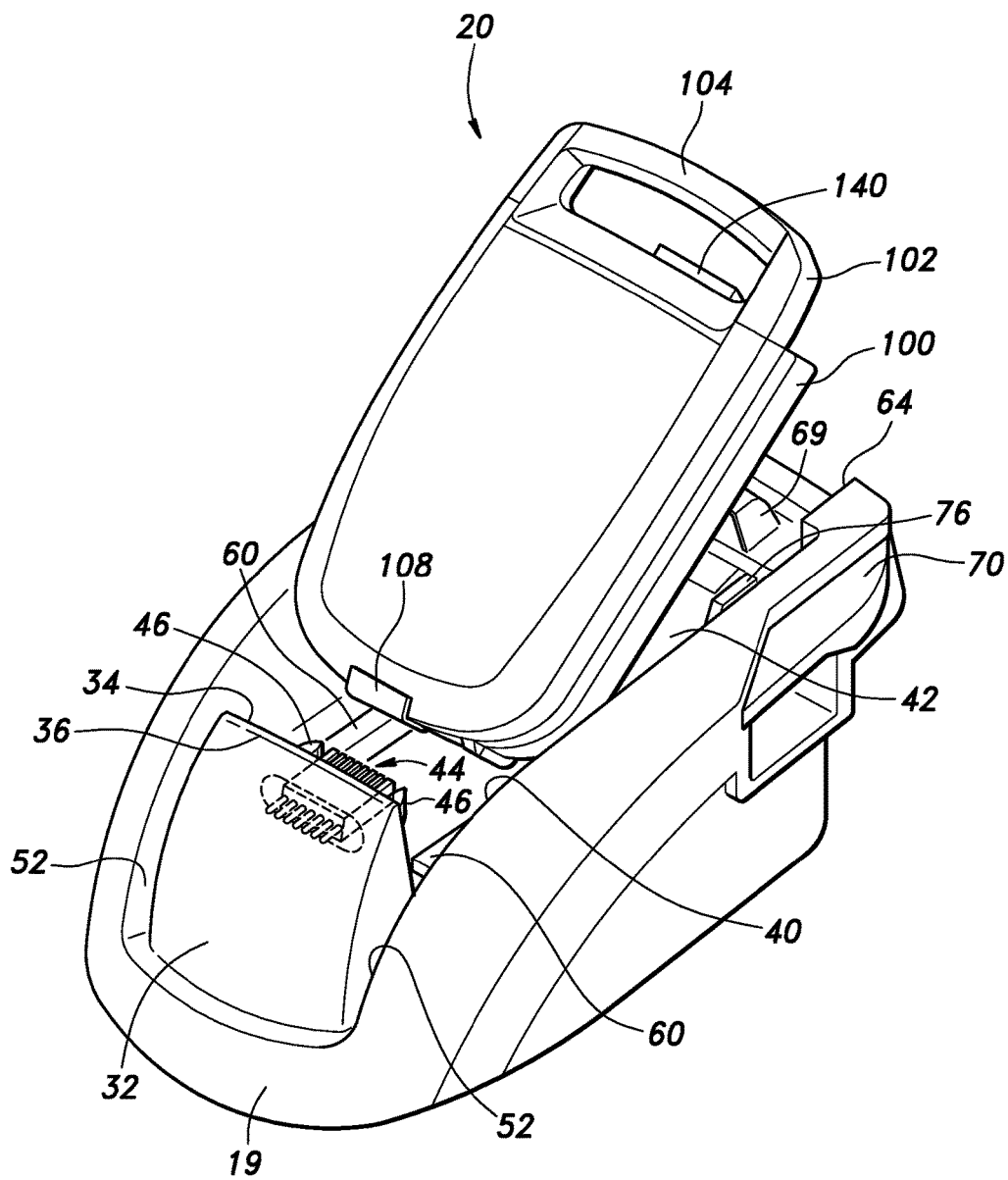
FIG. 14 is a perspective view of the mower when the battery is being placed into the battery receiving recess.

As shown in FIG. 13, owing to the forward slanting of the curved lower surface of the nose 108 of the battery 20, as the rear end of the battery 20 is lifted, the lower front edge of the battery 20 slides over the lower surface of the battery receiving recess 40.

The user holding the grip 104 pulls the battery 20 rearward, and eventually raises the battery 20 out of the battery receiving recess 40. In this manner, the battery 20 transitions from the substantially horizontal position to the upright position simply by pulling the battery 20 rearward so that the user is enabled to lift the battery 20 in a relatively effortless manner.

When placing the battery 20 in the battery receiving recess 40, the user suspends the battery 20 by holding the grip 104, and drops the front end of the battery 20 onto the bottom wall surface 42 of the battery receiving recess 40. The user then pushes the grip 104 forward while lowering the rear end of the battery 20.

At this time, the guided surfaces 114 of the guide ribs 110 of the battery 20 are guided by the guide surfaces 62 of the guide rails 60 so that the battery 20 is properly centered in the battery receiving recess 40.

Figure 16A:
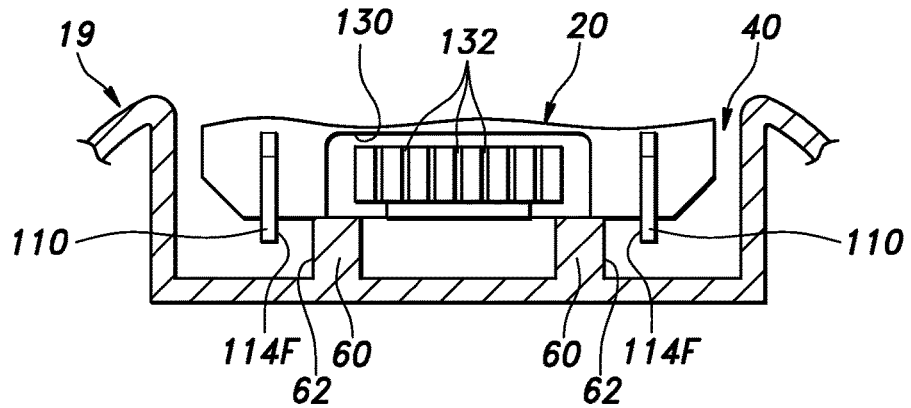
FIG. 16a, FIG. 16b and FIG. 16c are sectional views taken along line XVIa-XVIa, XVIb-XVIb and XVIc-XVIc of FIG. 15, respectively.
Figure 16B:
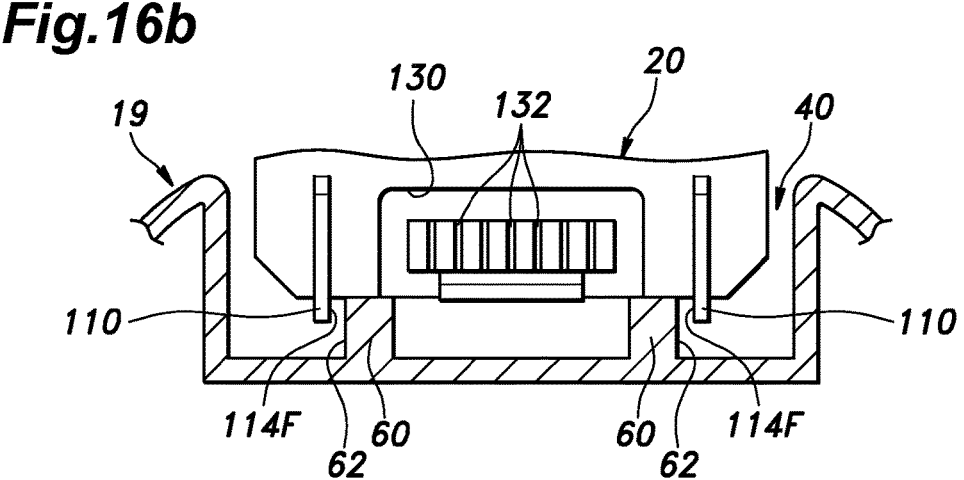
Figure 16C:
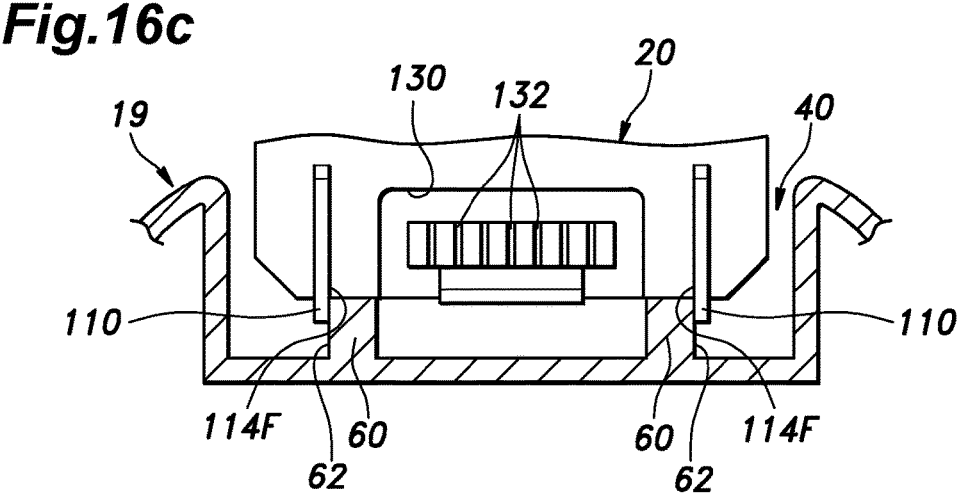

As shown in FIG. 16a, when the front end of the battery 20 is positioned in a middle part of the battery receiving recess 40 with respect to the fore and aft direction, in the region where the guide rails 60 and the guide ribs 110 are overlapping each other in side view, the spacing between the guide surfaces 62 of the guide rail 60 is significantly greater than the spacing between the guided surfaces 114 of the guide ribs 110. Therefore, when the front end of the battery 20 is dropped into the battery receiving recess 40, the guide rails 60 can be correctly interposed between the guide ribs 110 without any difficulty. As the front end of the battery 20 is pushed forward, the parts of the guide rails 60 interposed between the parts of the guide ribs 110 located in the front end part of the battery 20 become progressively more spaced apart from each other as shown in FIG. 16b and FIG. 16c. Therefore, the battery 20 is correctly centered in the battery receiving recess 40 as the battery 20 is pushed forward in an effortless manner.

When the battery 20 is pushed forward until the front engagement portion 136 of the battery 20 is positioned under the rib 50, and the rear end of the battery 20 is lowered, the rear engagement portion 140 starts riding over the locking claw of the latch member 66.

Figure 17:
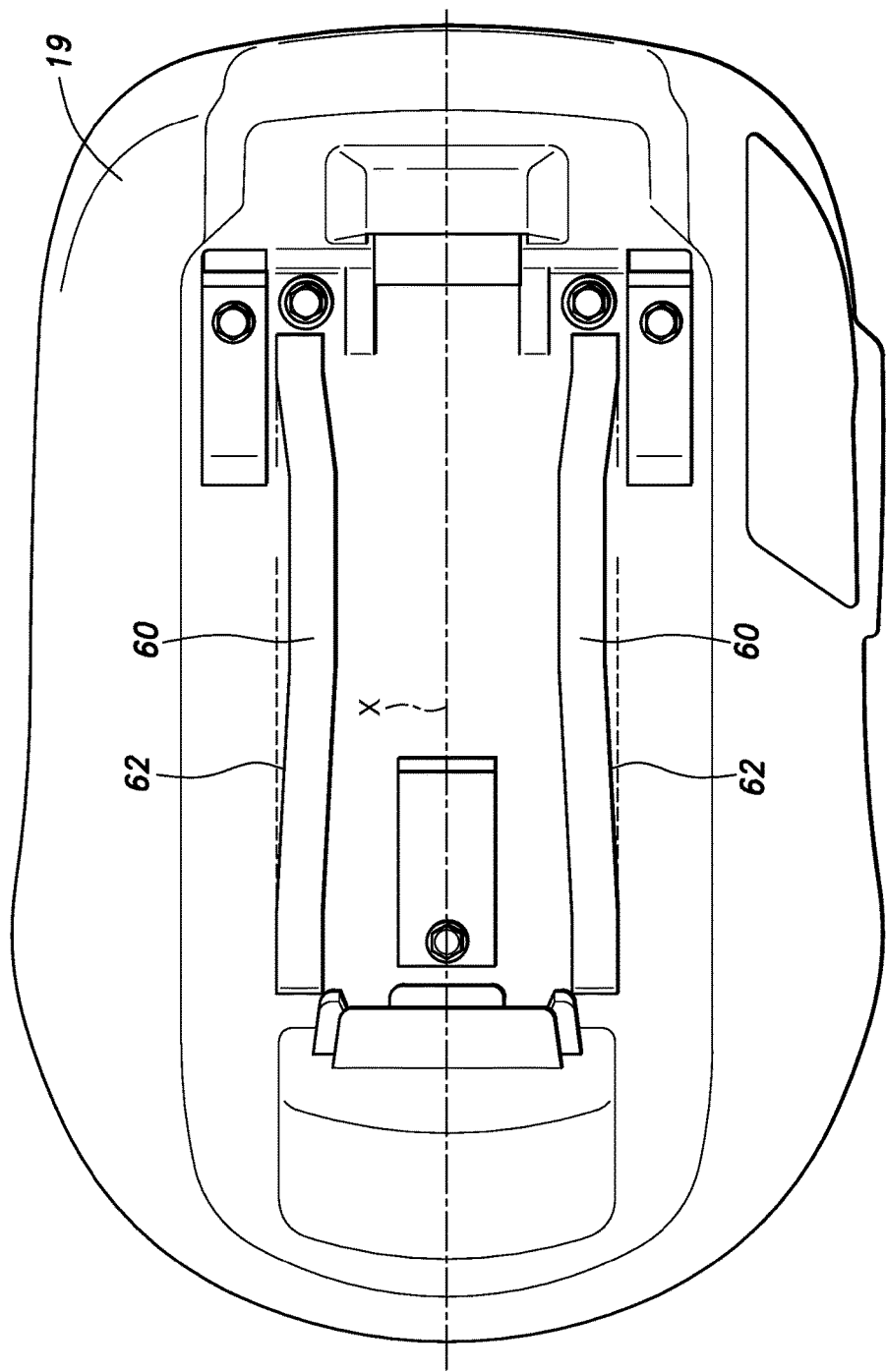
FIG. 17 is a simplified plan view of the battery tray of the mower.
Figure 18:
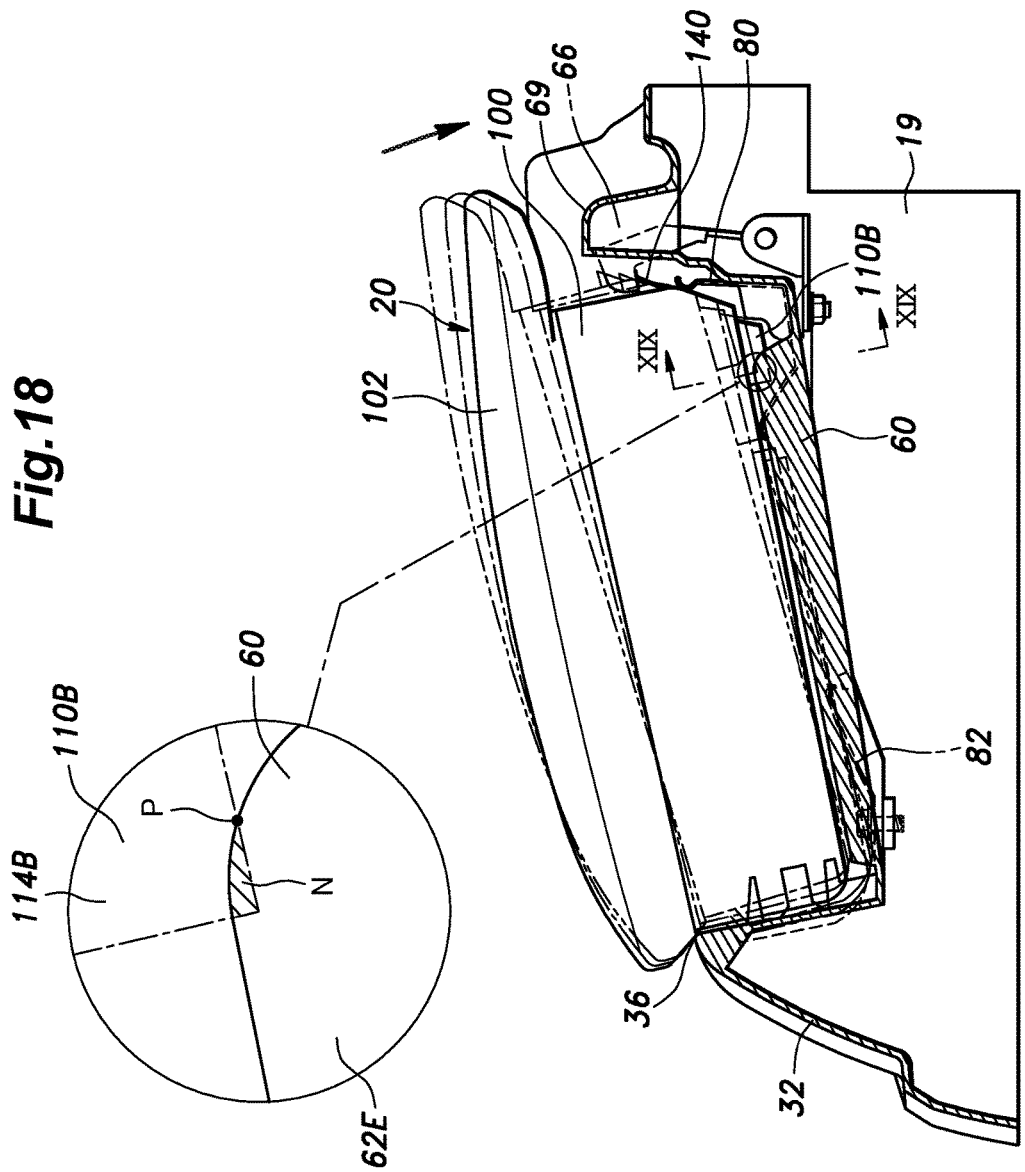
FIG. 18 is a side view showing the battery in a final phase of being placed into the battery receiving recess.
Figure 19:
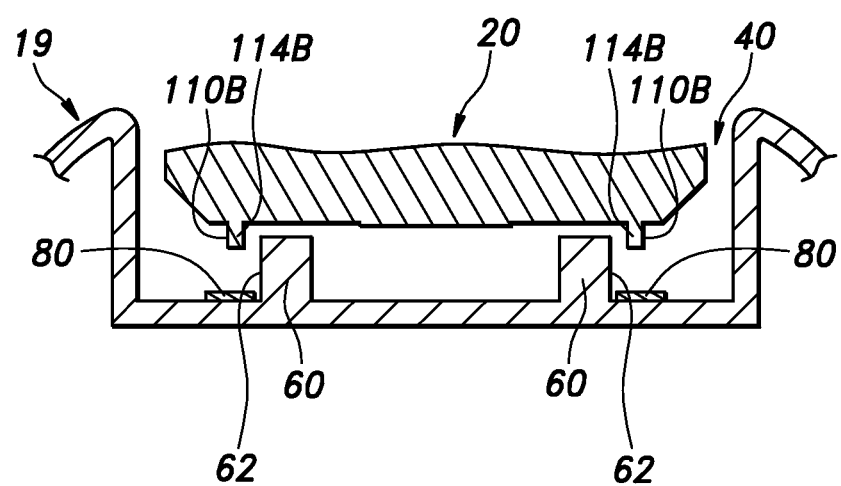
FIG. 19 is a sectional view taken along line XIX-XIX of FIG. 18.

As shown in FIG. 17, the spacing between the guide rails 60 increases from an intermediate part to the rear end of the battery receiving recess 40. Therefore, as the rear end part of the battery 20 descends, the front end parts of the rear guide ribs 110B interpose a relatively spread apart part of the guide rails 60. Therefore, a small region N where the guide ribs and the guide rails overlap each other in side view is created. As the rear end part of the battery 20 descends further, an increasing larger part of the rear guide ribs 110B overlap with the guide rails 60 in side view or the region N increases in size. In this case also, the guide rails 60 can be interposed between the rear guide ribs 110B without any difficulty, and the rear end part of the battery 20 can be centered in an accurate manner as the rear end of the battery 20 descends further into the battery receiving recess 40.

FIG. 17 shows extensions of the front ends of the guide surfaces drawn in the rear direction in dotted lines, and extensions of the rear ends of the guide surfaces drawn in the forward direction in chain-dot lines, and extensions of the rear ends of the guide surfaces drawing in the forward direction in chain-dot lines. It can be appreciated that as the overlapping region N expands in the rearward direction, the gap between the guide surfaces 62 of the guide rails 60 and the guided surfaces 114 of the guide ribs 110 diminishes.

As shown in FIG. 15, as the front end of the bottom part of the battery 20 slides forward along the upper surfaces of the guide rails 60, the battery side connector 132 is pushed against the mower side connector 44. Owing to the guiding action achieved by the cooperation between the guide surfaces 62 of the guide rails 60 and the guided surfaces 114 of the guide ribs 110, the two connectors 44 and 132 can be connected to each other in proper alignment.

In the final phase of placing the battery 20 in the battery receiving recess 40, the rear engagement portion 140 rides over the locking claw of the latch member against the spring force of the torsion coil spring 68, and the locking claw engages the shoulder surface of the rear engagement portion 140 under the spring force of the torsion coil spring 68.

When the battery 20 is thus fully received in the battery receiving recess 40, as shown in FIG. 16, the front guide ribs 110F and the rear guide ribs 110B are restrained laterally by the corresponding parts of the guide rails 60 so that the battery 20 does not shift laterally. Because the front engagement portion 136 of the battery 20 is engaged by the rib 50 projecting from the rear wall of the front part 32, and the second bottom surface engaging portion 122 is urged upward by the second sheet spring member 82, the front end of the battery 20 is prevented from moving in the vertical direction. Additionally, the rear ends of the first sheet spring members 80 push the battery 20 in the forward direction, and this also contributes to the firm engagement between the front engagement portion 136 and the rib 50.

Because the rear engagement portion 140 is engaged by the locking claw of the latch member 66, and the lower surface of the rear end part of the battery 20 is urged upward by the front ends 80a of the first sheet spring members 80, the rear end of the battery 20 is prevented from moving in the vertical direction.

The advantages of the electric mower 1 of the illustrated embodiment are discussed in the following.

The battery 20 is thus urged upward by the first sheet spring members 80 and the second sheet spring member 82 at the front part and the rear part thereof, respectively. Therefore, vibrations that are generated during the operation of the mower 1 are absorbed by the spring members, and abrasion between the terminal pieces 132b of the battery side connector 132 and the terminal pieces 44b of the mower side connector 44 can be minimized. Furthermore, when the engagement between the latch member 66 and the rear engagement portion 140 of the battery 20 is released, the battery 20 is pushed upward by the first sheet spring members 80 provided in the rear part of the bottom wall surface 42 of the battery receiving recess 40, and removal of the battery 20 from the battery tray 19 is facilitated.

When placing the battery 20 into the battery receiving recess 40, the front part of the battery 20 is centered in the battery receiving recess 40 owing to the cooperation between the guide rails 60 and the guide ribs 110. Thereafter, as the lower surface of the rear end of the battery 20 is brought closer to the bottom wall surface 42 of the battery receiving recess, the rear part of the battery 20 is also centered. Since the second sheet spring member 82 is located centrally in the bottom wall surface 42 of the bottom of the battery receiving recess 40 and is positioned between the guide rails 60, the second sheet spring member 82 does not hinder the movement of the battery 20.

When the battery 20 is being pushed forward after the front end of the battery 20 has been dropped into the battery receiving recess 40, the front slope of the second bottom surface engaging portion 122 engages the rear end of the second sheet spring member 82 so that the second bottom surface engaging portion 122 can smoothly ride over the rear end of the second sheet spring member 82. This is enhanced because the front slope is formed by a plurality of ribs extending in the fore and aft direction, and applies a relatively small frictional force to the battery 20.

The front ends 80a of the first sheet spring members 80 urge the lower surface of the battery 20 upward so that the battery 20 can be retained in a stable manner even when subjected to vibrations. Furthermore, the rear ends 80b of the first sheet spring members 80 urge the rear surface of the battery forward, and this also contributes to a stable retention of the battery 20 in the battery receiving recess 40.

Simply by pushing down the rear end of the battery removal lever 70, the latch member 66 is disengaged from the engagement portion 140 of the battery 20. Owing to the biasing forces of the first sheet spring members 80 and the second sheet spring member 82, the engagement portion 140 along with the battery 20 is raised and kept raised out of engagement with the latch member 66 so that the battery 20 can be readily removed from the battery receiving recess 40 with a single hand.

When the latch member 66 is disengaged, and the battery 20 is raised under the spring forces of the first sheet spring members 80 and the second sheet spring member 82, the mower side connector 44 is slightly pulled away from the battery side connector 132 so that the wear of the terminal pieces 44b and the front ends 132c of the terminal pieces 132b can be minimized. When the battery 20 is pulled rearward thereafter, because of the cooperation between the guide rails 60 and the guide ribs 110, the battery side connector 132 is pulled away from the mower side connector 44 in the correct direction so that, again, the wear of the terminal pieces 44b and the front ends 132c of the terminal pieces 132b can be minimized.

Although the present invention has been described in terms of a preferred embodiment thereof, it is obvious to a person skilled in the art that various alterations and modifications are possible without departing from the scope of the present invention. For instance, the battery 20 was placed into the battery receiving recess 40 in a forward direction of the mower, but this direction may be varied depending on the particular application of the power equipment without departing from the spirit of the present invention.

The invention claimed is:

1. An electric power equipment, comprising:
  a battery tray defining a battery receiving recess having an open upper end, the battery receiving recess having a first end and a second end remote from the first end;
  a battery configured to be removably received in the battery receiving recess, the battery having a first end and a second end corresponding to the first end and the second end of the battery receiving recess, respectively, a grip being provided at the first end of the battery;
  an engagement portion provided in a lower part of the second end of the battery receiving recess;
  a corresponding engagement portion provided in a lower part of the second end of the battery, the corresponding engagement portion being configured to be engaged by the engagement portion of the battery receiving recess against a vertical movement;
  a first spring member provided in a part of a bottom surface of the battery receiving recess proximate to the first end thereof to urge the battery received in the battery receiving recess upward; and
  a latch member provided in a part of the battery tray adjoining the first end of the battery receiving recess to selectively retain the battery from an upward movement,
  wherein the electric power equipment further comprises a pair of guide rails provided on the bottom surface of the battery receiving recess and extending from the first end to the second end of the battery receiving recess in a mutually spaced apart relationship, and a pair of guided members provided on a lower surface of the battery and laterally spaced from each other so as to be engaged by a section of the respective guide rails as the second end of the battery is slid from an intermediate part of the bottom surface of the battery receiving recess to the second end of the battery receiving recess, a spacing between the guide rails progressively increasing from a first end of the section on a side of the first end of the battery receiving recess to a second end of the section on a side of the second end of the battery receiving recess, the spacing between the guide rails at the second end of the section being substantially equal to a corresponding spacing between the guided members.

2. The electric power equipment according to claim 1, wherein the guided members comprise a pair of guide ribs extending on the lower surface of the battery from the first end to the second end, extensions of the guide ribs extending along at least a part of an upright surface on the second end of the battery.

3. The electric power equipment according to claim 1, further comprising a second spring member provided in a part of the bottom surface of the battery receiving recess proximate to the second end thereof to urge the battery received in the battery receiving recess upward.

4. The electric power equipment according to claim 3, further comprising a projection projecting from the lower surface of the battery, wherein the projection is provided with a main part and a slope extending from an end of the main part on a side of the second end of the battery receiving recess toward the second end of the battery receiving recess, the second spring member engaging the main part of the projection when the battery is fully received in the battery receiving recess.

5. The electric power equipment according to claim 4, wherein the slope is formed by a plurality of ribs extending from the main part of the projection toward the second end of the battery receiving recess.

6. An electric power equipment, comprising:
a battery tray defining a battery receiving recess having an open upper end, the battery receiving recess having a first end and a second end remote from the first end;
a battery configured to be removably received in the battery receiving recess, the battery having a first end and a second end corresponding to the first end and the second end of the battery receiving recess, respectively, a grip being provided at the first end of the battery;
an engagement portion provided in a lower part of the second end of the battery receiving recess;
a corresponding engagement portion provided in a lower part of the second end of the battery, the corresponding engagement portion being configured to be engaged by the engagement portion of the battery receiving recess against a vertical movement;
a first spring member provided in a part of a bottom surface of the battery receiving recess proximate to the first end thereof to urge the battery received in the battery receiving recess upward; and
a latch member provided in a part of the battery tray adjoining the first end of the battery receiving recess to selectively retain the battery from an upward movement,
wherein a part of the battery tray defining a second end of the battery tray corresponding to the second end of the battery receiving recess is provided with an upward projection, and an upper second end part of the battery corresponding to the second end of the battery tray is provided with a nose defining a slanted lower surface configured to rest upon the upward projection when the first end of the battery is lifted to remove the battery from the battery receiving recess.

7. An electric power equipment, comprising:
a battery tray defining a battery receiving recess having an open upper end, the battery receiving recess having a first end and a second end remote from the first end;
a battery configured to be removably received in the battery receiving recess, the battery having a first end and a second end corresponding to the first end and the second end of the battery receiving recess, respectively, a grip being provided at the first end of the battery;
an engagement portion provided in a lower part of the second end of the battery receiving recess;
a corresponding engagement portion provided in a lower part of the second end of the battery, the corresponding engagement portion being configured to be engaged by the engagement portion of the battery receiving recess against a vertical movement;
a first spring member provided in a part of a bottom surface of the battery receiving recess proximate to the first end thereof to urge the battery received in the battery receiving recess upward; and
a latch member provided in a part of the battery tray adjoining the first end of the battery receiving recess to selectively retain the battery from an upward movement,
wherein the first spring member comprises a sheet spring including a middle part attached to the bottom surface of the battery receiving recess, a second end part extending from the middle part toward the second end of the battery receiving recess with an upward slant, and a first end part extending upright from the middle part, the first end part of the sheet spring being configured to urge the first end of the battery upward, the second end part of the sheet spring being configured to urge the battery toward the second end of the battery receiving recess.

8. The electric power equipment according to claim 7, wherein the battery tray is provided with a lever for unlatching the latch member from the battery.

9. The electric power equipment according to claim 8, wherein the second end part of the sheet spring is configured to raise and keep the first end of the battery out of engagement from the latch member once the latch member is unlatched.

10. The electric power equipment according to claim 1, wherein the second end of the battery is provided with a battery side connector, and the second end of the battery receiving recess is provided with a power equipment side connector configured to be electrically connected to the battery side connector when the battery is fully received by the battery receiving recess.

* * * * *